US012771951B2

(12) United States Patent
Jang et al.

(10) Patent No.: US 12,771,951 B2
(45) Date of Patent: Oct. 20, 2026

(54) IMAGE ACQUISITION APPARATUS AND METHOD EMPLOYING LENS ARRAY

(71) Applicant: SAMSUNG ELECTRONICS CO., LTD., Suwon-si (KR)

(72) Inventors: Soongeun Jang, Suwon-si (KR); Woo-Shik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 18/668,613

(22) Filed: May 20, 2024

(65) Prior Publication Data

US 2025/0039561 A1 Jan. 30, 2025

(30) Foreign Application Priority Data

Jul. 25, 2023 (KR) ........................ 10-2023-0097034

(51) Int. Cl.
*H04N 23/84* (2023.01)
*H04N 23/88* (2023.01)
(Continued)

(52) U.S. Cl.
CPC ........... *H04N 23/843* (2023.01); *H04N 23/88* (2023.01); *H04N 23/951* (2023.01); *H04N 25/11* (2023.01)

(58) Field of Classification Search
CPC ...... H04N 23/84; H04N 23/843; H04N 23/88; H04N 25/11; H04N 25/13; H04N 25/134; G06T 3/40; G06T 3/4015
(Continued)

(56) References Cited

U.S. PATENT DOCUMENTS

| | | | | |
|---|---|---|---|---|
| 9,083,935 | B2 * | 7/2015 | Demandolx | G06T 5/92 |
| 2010/0128152 | A1 * | 5/2010 | Hayasaka | G02B 13/001 348/277 |

(Continued)

FOREIGN PATENT DOCUMENTS

| | | | |
|---|---|---|---|
| CN | 115696079 | A | 2/2023 |
| KR | 10-2022-0155840 | A | 11/2022 |

(Continued)

OTHER PUBLICATIONS

Cheng, Zhen et al., "Light Field Super-Resolution with Zero-Shot Learning", IEEE, CVPRW, 2021, pp. 10010-10019. (10 pages total).

(Continued)

*Primary Examiner* — Anthony J Daniels
(74) *Attorney, Agent, or Firm* — Sughrue Mion, PLLC

(57) ABSTRACT

An image acquisition apparatus includes an image sensor including a microlens and a plurality of pixels arranged adjacent to each other and sharing the microlens; and a processor configured to process an input image acquired by the image sensor, wherein the processor may be further configured to: generate a plurality of parallax images by extracting and combining sub-images having a same parallax from the input image; generate RGB demosaic images by interpolating a color value of an empty pixel for each of the plurality of parallax images by using color values of surrounding pixels; generate a plurality of upsampled images by upsampling each of the RGB demosaic images to an input image size; and generate an output image by weighted-summing one upsampled image selected from the upsampled images and the other upsampled images based on a similarity therebetween.

19 Claims, 21 Drawing Sheets

(51) Int. Cl.
*H04N 23/951* (2023.01)
*H04N 25/11* (2023.01)

(58) Field of Classification Search
USPC ........................................................ 348/223.1
See application file for complete search history.

(56) References Cited

U.S. PATENT DOCUMENTS

| | | | | |
|---|---|---|---|---|
| 2012/0105691 | A1 | 5/2012 | Waqas et al. | |
| 2013/0222553 | A1* | 8/2013 | Tsuchita | H04N 13/286 348/49 |
| 2014/0198188 | A1 | 7/2014 | Izawa | |
| 2016/0132998 | A1* | 5/2016 | Nakano | G06T 3/4007 382/268 |
| 2016/0344952 | A1* | 11/2016 | Ichihara | H04N 13/232 |
| 2017/0053379 | A1* | 2/2017 | Wang | G06T 3/4015 |
| 2020/0007760 | A1 | 1/2020 | Yokokawa et al. | |
| 2022/0108424 | A1* | 4/2022 | Gan | G06T 3/4015 |
| 2022/0159205 | A1* | 5/2022 | Yokokawa | H04N 25/46 |
| 2022/0366588 | A1 | 11/2022 | Cho et al. | |
| 2023/0027452 | A1 | 1/2023 | Powell et al. | |
| 2024/0079430 | A1 | 3/2024 | Cho et al. | |
| 2024/0193801 | A1* | 6/2024 | Ahn | G06T 7/571 |
| 2024/0244333 | A1 | 7/2024 | Jang et al. | |
| 2024/0249513 | A1 | 7/2024 | Jang et al. | |

FOREIGN PATENT DOCUMENTS

| | | | |
|---|---|---|---|
| KR | 10-2024-0032515 | A | 3/2024 |
| KR | 10-2024-0117327 | A | 8/2024 |
| WO | 2018/163843 | A1 | 9/2018 |

OTHER PUBLICATIONS

Sharif, S M A et al., "Beyond Joint Demosaicking and Denoising: An Image Processing Pipeline for a Pixel-bin Image Sensor", arXiv:2104.09398v1 [cs.CV], Apr. 19, 2021, pp. 1-10. (10 pages total).

Communication dated Sep. 20, 2024, issued by the European Patent Office in European Application No. 24181049.8.

* cited by examiner

IMAGE ACQUISITION APPARATUS AND METHOD EMPLOYING LENS ARRAY

CROSS-REFERENCE TO RELATED APPLICATION

This application is based on and claims priority under 35 U.S.C. § 119 to Korean Patent Application No. 10-2023-0097034, filed on Jul. 25, 2023, in the Korean Intellectual Property Office, the disclosure of which is incorporated by reference herein in its entirety.

BACKGROUND

1. Field

The disclosure relates to an image acquisition apparatus and method employing a lens array.

2. Description of Related Art

An image sensor may include a red color filter, a green color filter, and a blue color filter arranged in a predetermined pattern on a light sensing pixel for imaging of a color image. For example, the color filter may be configured in a quad Bayer pattern in which 2×2 pixels of the same color are located under one microlens.

The quad Bayer pattern may be used for auto-focusing on a photographing target by using the parallax of light passing through the same microlens. The image sensor requires a demosaicing process to include all red color, green color, and blue color information in one pixel. However, in the case of a quad Bayer pattern, parallax occurs between the same color pixels, and thus, parallax restoration processing is required for the demosaicing processing.

High-definition image acquisition apparatuses may have problems in that more logic and memory for parallax restoration processing is required as the number of pixels in a color filter array included in a conventional image sensor increases.

SUMMARY

Provided are image acquisition apparatuses and methods capable of minimizing an increase in logic and memory for parallax restoration processing in a demosaicing process.

According to an aspect of the disclosure, an image acquisition apparatus includes: an image sensor including a microlens and a plurality of pixels arranged adjacent to each other and sharing the microlens; and a processor configured to process an input image acquired by the image sensor, wherein the processor may be further configured to: generate a plurality of parallax images by extracting and combining sub-images having a same parallax from the input image; generate RGB demosaic images by interpolating a color value of an empty pixel for each of the plurality of parallax images by using color values of surrounding pixels; generate a plurality of upsampled images by upsampling each of the RGB demosaic images to an input image size; and generate an output image by weighted-summing one reference upsampled image selected from the upsampled images and the other upsampled images based on a similarity therebetween.

The processor may be further configured to generate the RGB demosaic images by using one of average value interpolation, linear interpolation, cubic interpolation, and directional by linear interpolation.

The image sensor may include: a quad Bayer pattern array in which pixels arranged in a 2×2 matrix include respective color filters having a same color; or a quad square Bayer pattern array in which pixels arranged in a 4×4 matrix include respective color filters having a same color.

The processor may be further configured to generate, as the plurality of parallax images, a parallax A image, a parallax B image, a parallax C image, and a parallax D image from the input image.

The processor may include: a plurality of logics configured to simultaneously interpolate each of the parallax A image, the parallax B image, the parallax C image, and the parallax D image; or a single logic configured to sequentially interpolate the parallax A image, the parallax B image, the parallax C image, and the parallax D image.

The processor may be further configured to generate the upsampled images by using one of a bi-linear interpolation, a bi-cubic interpolation, and a deep learning network.

The processor may be further configured to determine the similarity between the reference upsampled image and the other upsampled images by using one of a sum of absolute differences (SAD), a sum of squared differences (SSD), a normalized cross correlation (NCC), and a zero-mean normalized cross correlation (ZNCC).

The processor may be further configured to detect an aliasing region of the upsampled images.

The processor may be further configured to increase a weight of the similarity in a case that the similarity between the reference upsampled image and the other upsampled images is lower than a preset value in the aliasing region.

The processor may be further configured to: output edge result values by using directional filters; output an edge absolute value by performing absolute value processing of the edge result values; and generate an edge map by using an input value determined based on the edge absolute value and a control signal.

The directional filters include a horizontal directional filter, a vertical directional filter, a 45-degree directional filter, and a 135-degree directional filter.

The control signal may include one of: a first control signal to generate the edge map by using, as the input value, a maximum value among an edge absolute value of the horizontal directional filter, an edge absolute value of the vertical directional filter, an edge absolute value of the 45-degree directional filter, and an edge absolute value of the 135-degree directional filter; a second control signal to generate the edge map by using, as the input value, an average value of the edge absolute value of the horizontal directional filter, the edge absolute value of the vertical directional filter, the edge absolute value of the 45-degree directional filter, and the edge absolute value of the 135-degree directional filter; and a third control signal to generate the edge map by using, as the input value, a maximum value of a weighted average value of the edge absolute value of the horizontal directional filter and the edge absolute value of the vertical directional filter and a weighted average value of the edge absolute value of the 45-degree directional filter, and the edge absolute value of the 135-degree directional filter.

The processor may be further configured to: determine that the input value is not an edge based on the input value being less than a first threshold value; determine that the input value is an edge based on the input value being greater than a second threshold value; and perform linear interpolation based on determining that the input value is between the first threshold value and the second threshold value.

The processor may be further configured to perform a white balance processing on the input image before generating the plurality of parallax images.

The processor may be further configured to perform a color shading compensation on the input image before the white balance processing.

The processor may be further configured to crop only a target region from the input image between the color shading compensation and the white balance processing.

According to an aspect of the disclosure, an image acquisition method, used by an image acquisition apparatus including an image sensor, including a microlens and a plurality of pixels arranged adjacent to each other and sharing the microlens, includes: generating a plurality of parallax images by extracting and combining sub-images having a same parallax from an input image acquired by the image sensor; demosaicing images by interpolating a color value of an empty pixel for each of the plurality of parallax images by using color values of surrounding pixels; generating, by an upsampling unit, a plurality of upsampled images by upsampling each of the interpolated parallax images to an input image size; and image-synthesizing comprising generating an output image by weighted-summing one upsampled image selected from the upsampled images and the other upsampled images based on a similarity therebetween.

The image sensor may include: a quad Bayer pattern array in which pixels arranged in a 2×2 matrix include respective color filters having same color; or a quad square Bayer pattern array in which pixels arranged in a 4×4 matrix include respective color filters having same color.

The image-synthesizing may further include detecting an aliasing region of the upsampled images.

In the image-synthesizing, a weight of the similarity is increased in a case that the similarity is lower than a preset value in the aliasing region.

BRIEF DESCRIPTION OF THE DRAWINGS

The above and/or other aspects will be more clearly understood from the following detailed description taken in conjunction with the accompanying drawings, in which.

DETAILED DESCRIPTION

Figure 1:
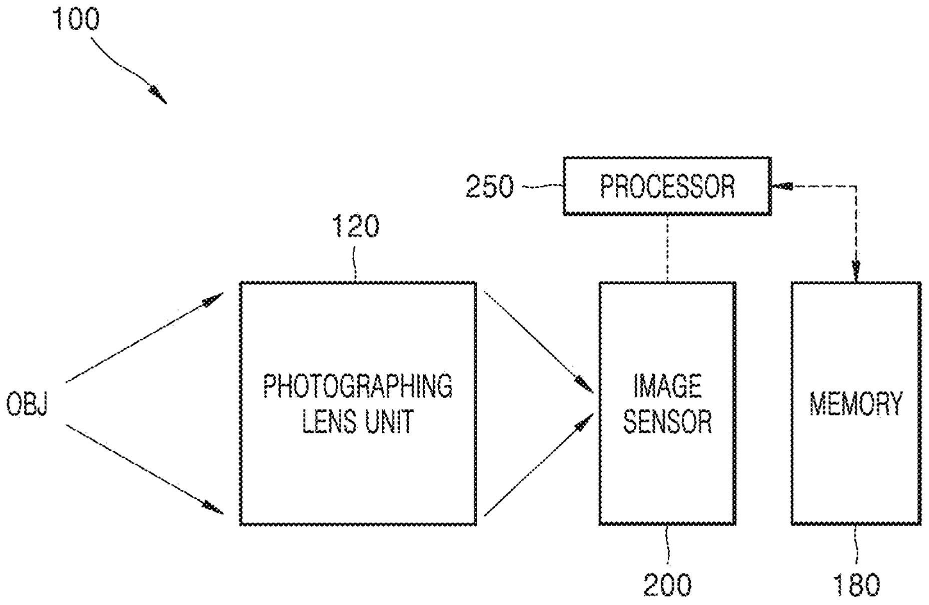
FIG. 1 schematically illustrates a configuration of an image acquisition apparatus according to an embodiment.

Hereinafter, example embodiments will be described in detail with reference to the accompanying drawings. In the following drawings, the same reference numerals refer to the same components, and the size of each component in the drawings may be exaggerated for clarity and convenience of description. The embodiments described below are merely examples and various modifications are possible from these embodiments.

Hereinafter, the term "upper portion" or "on" may also include "to be present above on a non-contact basis" as well as "to be on the top portion in directly contact with". The singular expression includes plural expressions unless the context clearly implies otherwise. In addition, when a part "includes" a component, this means that it may further include other components, not excluding other components unless specifically stated to the contrary. The use of the term "the" and similar indicative terms may correspond to both singular and plural.

In addition, some embodiments are described in the accompanying drawings with respect to functional blocks, units and/or modules. Those skilled in the art will appreciate that these blocks, units and/or modules are physically implemented by logic circuits, discrete components, microprocessors, hard wire circuits, memory devices, wire connections, and other electronic circuits. This may be formed using semiconductor-based manufacturing technology or other manufacturing technology. For blocks, units, and/or modules implemented by a microprocessor or other similar hardware, the software programs may be programmed and controlled using software to perform various functions discussed herein, and may optionally be driven by firmware and/or software. In addition, each block, unit, and/or module may be implemented by dedicated hardware, or may be implemented as a combination of processors (e.g., one or more programmed microprocessors and associated circuits) that perform functions different from dedicated hardware performing some functions. In addition, in some embodiments, the blocks, units, and/or modules may be physically separated into two or more separate blocks, units, and/or modules that interact within the scope without departing from the scope of the inventive concept. In addition, in some embodiments, the blocks, units, and/or modules may be physically and more complex blocks, units, and/or modules within the scope without departing from the scope of the inventive concept.

FIG. 1 schematically illustrates a configuration of an apparatus for obtaining an image according to an embodiment.

Referring to FIG. 1, an image acquisition apparatus 100 may include an image sensor 200 that acquires an individual color image signal by converting, into an electrical signal, an optical image formed by a photographing lens unit 120 by focusing light reflected from an object OBJ, and a processor 250 that generates an output signal by processing the individual color image signal acquired by the image sensor 200. The image acquisition apparatus 100 may further include a memory 180 and the like for storing the individual color image signal and an image formed by the processor 250. An additional optical element, such as an infrared blocking filter, may be further arranged between the image sensor 200 and the photographing lens unit 120.

Figure 2:
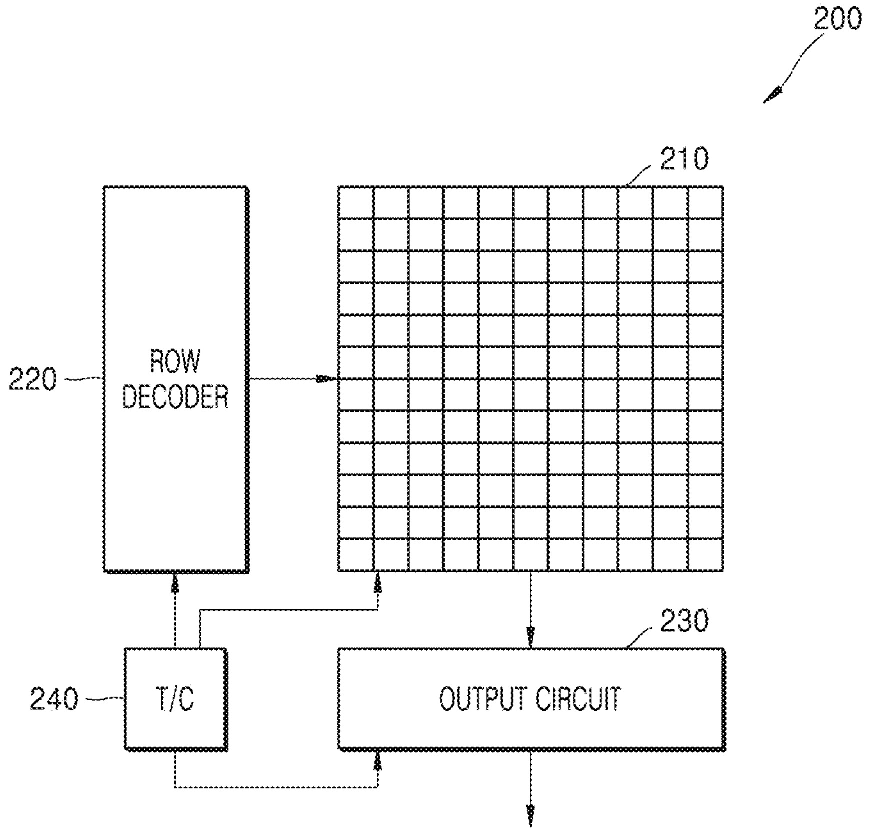
FIG. 2 is a schematic block diagram of an image sensor according to an embodiment.

FIG. 2 is a schematic block diagram of the image sensor 200 according to an embodiment.

Referring to FIG. 2, the image sensor 200 may include a pixel array 210, a timing controller 240 (which may also be referred to as "T/C"), a row decoder 220, and an output circuit 230. The image sensor 200 may be a charge coupled device (CCD) image sensor or a complementary metal oxide semiconductor (CMOS) image sensor.

The pixel array 210 includes pixels arranged in two dimensions along a plurality of rows and columns. The row decoder 220 selects one of the rows of the pixel array 210 in response to a row address signal output from the timing controller 240. The output circuit 230 outputs a light sensing signal in units of columns from a plurality of pixels arranged along the selected row. To this end, the output circuit 230 may include a column decoder and an analog to digital converter (ADC). For example, the output circuit 230 may include a plurality of ADCs placed on each column between the column decoder and the pixel array 210, or one ADC placed on the output end of the column decoder. The timing controller 240, the row decoder 220, and the output circuit 230 may be implemented as one chip or respective separate chips. The processor 250 of FIG. 1 for processing the image signal output through the output circuit 230 may be implemented as a single chip along with the timing controller 240, the row decoder 220, and the output circuit 230.

The pixel array 210 may include a plurality of pixels that sense light of different wavelengths. The arrangement of pixels may be implemented in various ways. For example, FIG. 3A and FIG. 3B, which will be described herein, illustrate various arrangements of the pixel array 210.

Figure 3A:
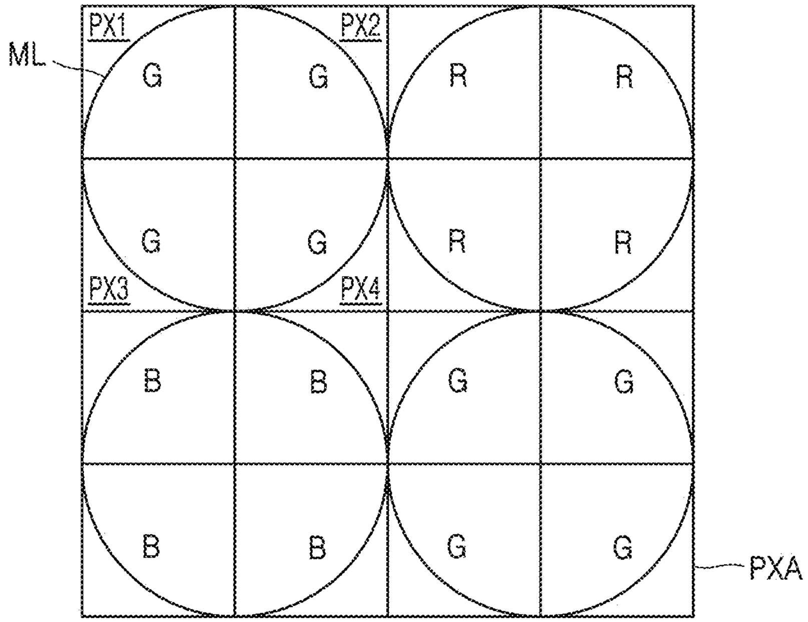
FIG. 3A is a plan view corresponding to one area of a quad Bayer pattern.
Figure 3B:
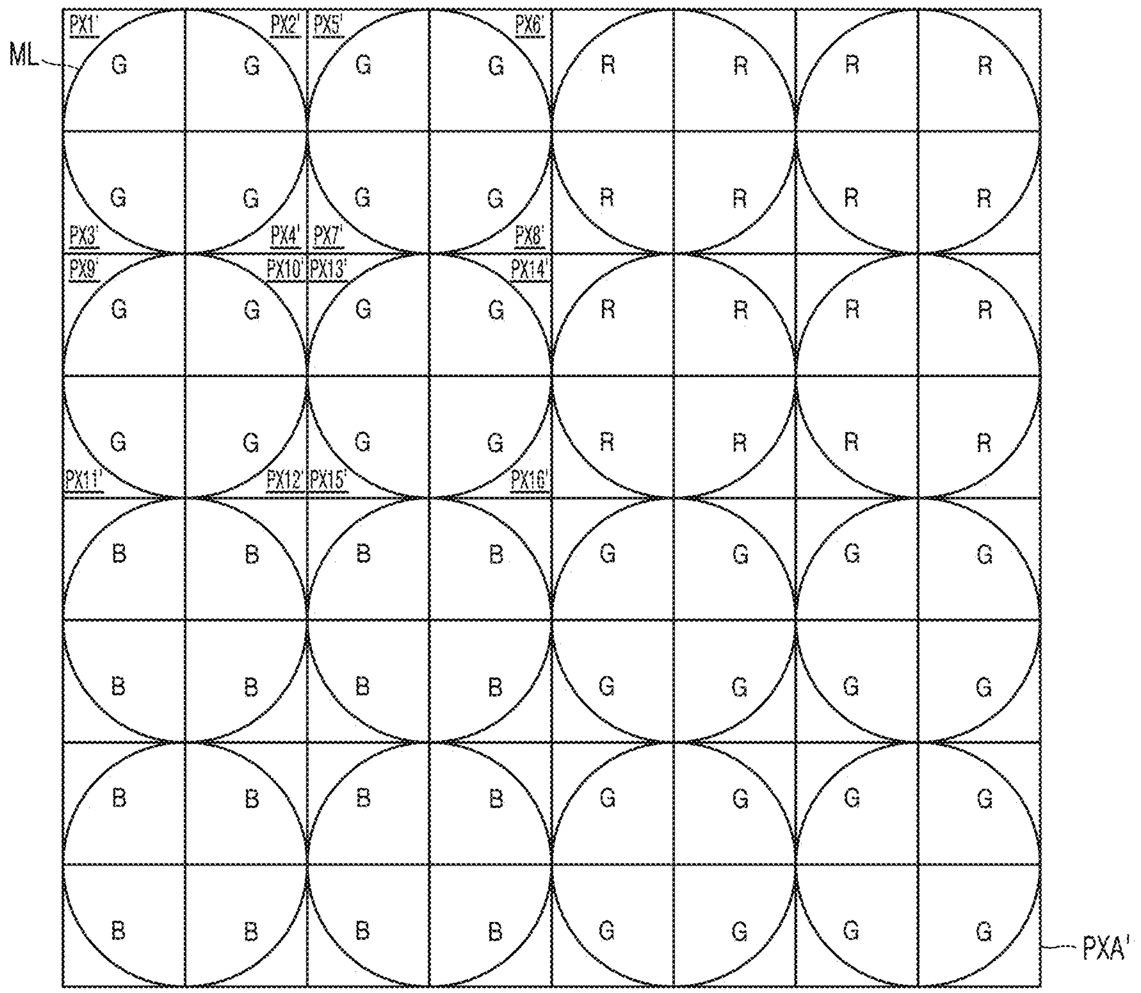
FIG. 3B is a plan view corresponding to one area of a quad square Bayer pattern.
Figure 3C:
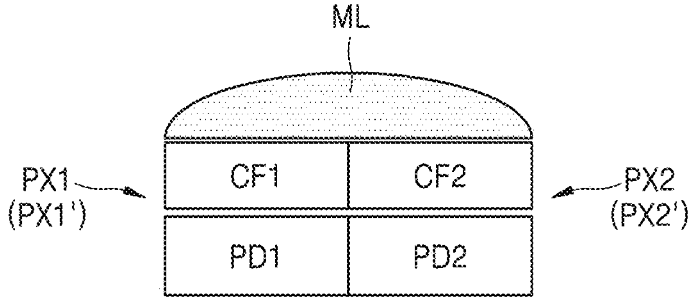
FIG. 3C is a cross-sectional view corresponding to one area of a pixel array illustrated in FIGS. 3A and 3B.

FIG. 3A is a plan view corresponding to one area of a quad Bayer pattern. FIG. 3B is a plan view corresponding to one area of a quad square Bayer pattern. FIG. 3C is a cross-sectional view corresponding to one area of a pixel array illustrated in FIGS. 3A and 3B.

Referring to FIG. 3A, FIG. 3B, and FIG. 3C, the pixel array PXA may have a quad Bayer pattern structure. The four pixels arranged in 2×2 (two rows and two columns) may include respective color filters of the same color. Accordingly, the pixel array PXA may include 4×4 pixels, which consist of 2×2 green pixels G, 2×2 red pixels R, 2×2 blue pixels B, and 2×2 green pixels G.

Each of the pixels included in the pixel array PXA' may include a color filter and a light receiving element (e.g., a photodiode). For example, a first pixel PX1 may include a first color filter CF1 and a first light receiving element PD1, and a second pixel PX2 may include a second color filter CF2 and a second light receiving element PD2. The first color filter CF1 and the second color filter CF2 may have the same color (e.g., green).

The first pixel PX1, the second pixel PX2, a third pixel PX3, and a fourth pixel PX4 are arranged adjacent to one another, and may share one microlens ML. The microlens ML may have a convex shape to condense light incident on unit pixels (e.g., the first pixel PX1, the second pixel PX2, the third pixel PX3, and the fourth pixel PX4). The microlens ML may have a hemispherical cross section. From a planar point of view, the microlens ML may have a circular shape. When the microlens ML is included, sensitivity of the image sensor 200 may be improved. That is, the optical characteristics of the image sensor 200 may be improved.

Referring to FIG. 3B and FIG. 3C, the pixel array PXA' may have a quad square Bayer pattern structure. The 16 pixels arranged in 4×4 (four rows and four columns) may include respective color filters of the same color. Accordingly, the pixel array PXA' may include 8×8 pixels, which consist of 4×4 green pixels G, 4×4 red pixels R, 4×4 blue pixels B, and 4×4 green pixels G.

Each of the pixels included in the pixel array PXA' may include a color filter and a light receiving element (e.g., a photodiode). For example, a first' pixel PX1' may include a first color filter CF1 and a first light receiving element PD1, and a second' pixel PX2' may include a second color filter CF2 and a second light receiving element PD2. The first color filter CF1 and the second color filter CF2 may have the same color (e.g., green).

The first' pixel PX1' to the sixteenth' pixel PX16' are arranged adjacent to one another, and each unit pixel group of the first' to fourth' pixels PX1' to PX4', the fifth' to eighth' pixels PX5' to PX8', the ninth' to twelfth' pixels PX9' to PX12', and the thirteenth' to sixteenth' pixels PX13' to PX16' may share one microlens ML. The microlens ML may have a convex shape to condense light incident on unit pixels (e.g., the first' pixel PX1', the second' pixel PX2', the third' pixel PX3', and the fourth' pixel PX4'). The microlens ML may have a hemispherical cross section. From a planar point of view, the microlens ML may have a circular shape.

Figure 3D:
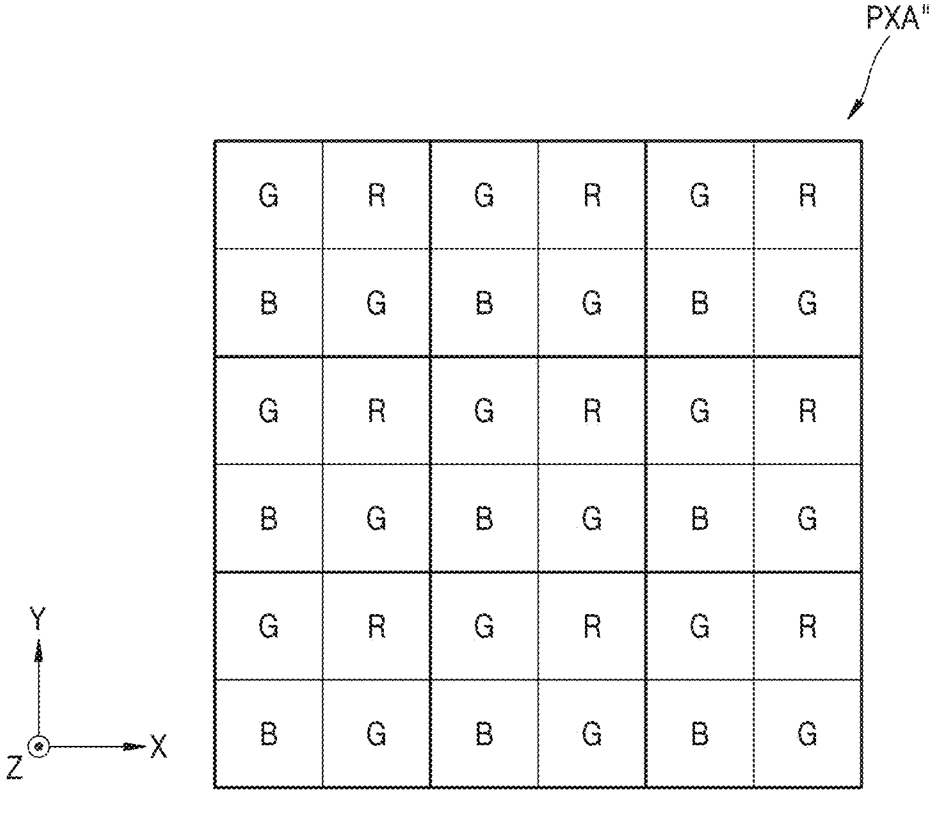
FIG. 3D is a plan view illustrating a color arrangement of a pixel array of an image sensor according to an embodiment.
Figure 3E:
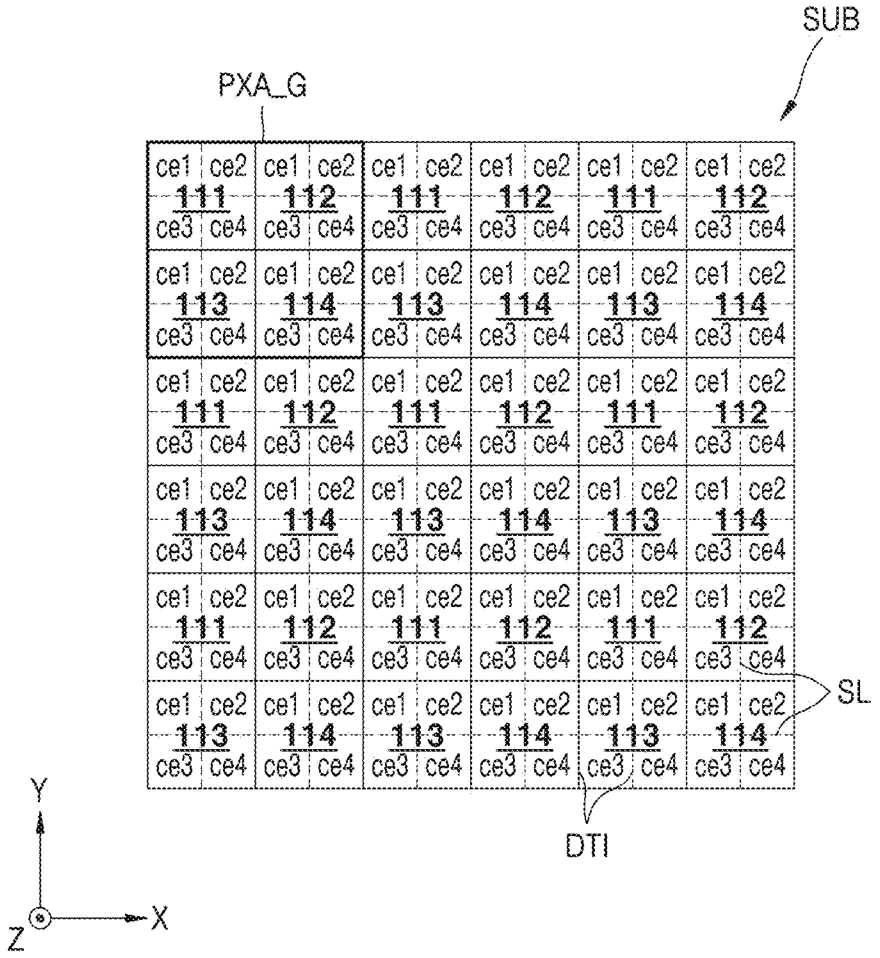
FIG. 3E is a plan view for explaining a sensor substrate and a meta-prism array provided in a pixel array of the image sensor illustrated in FIG. 3D.
Figure 3F:
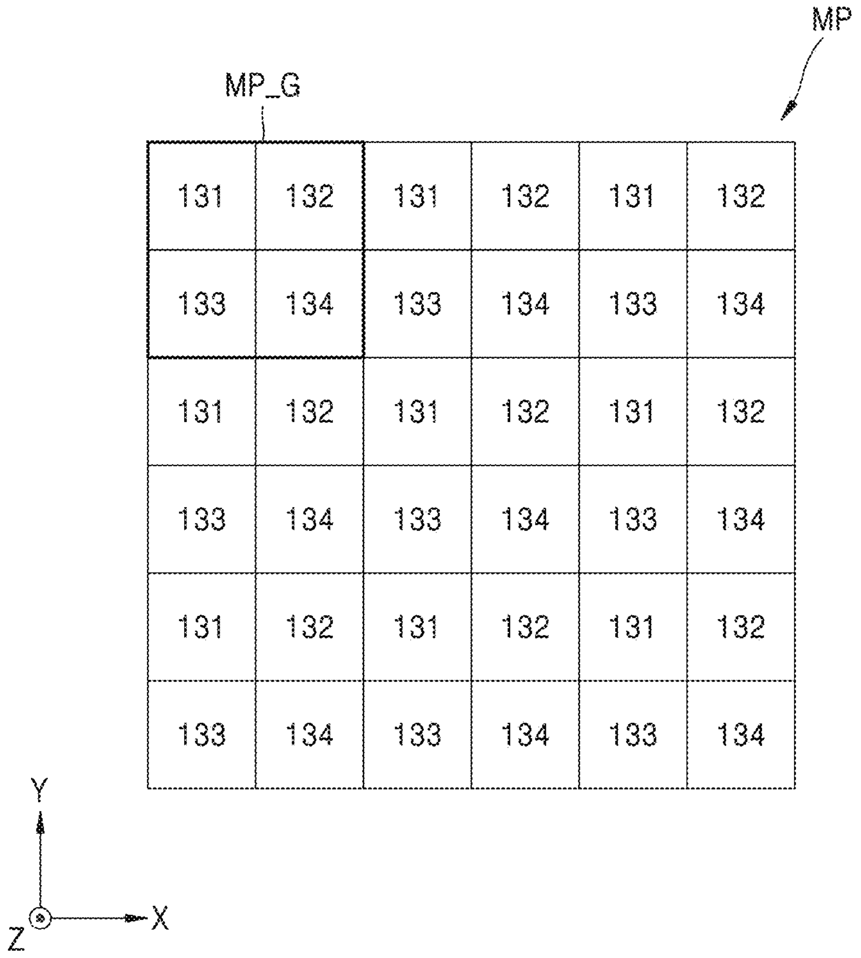
FIG. 3F is a plan view for explaining a sensor substrate and a meta-prism array provided in a pixel array of the image sensor illustrated in FIG. 3D

FIG. 3D is a plan view illustrating a color arrangement indicated by a pixel array of an image sensor according to an embodiment. FIG. 3E and FIG. 3F are plan views for explaining a sensor substrate and a meta-prism array provided in a pixel array of the image sensor illustrated in FIG. 3D.

The color arrangement illustrated in FIG. 3D is an arrangement of a Bayer pattern. As illustrated, one unit pattern includes four quadrant regions, and the first to fourth quadrants may represent red (R), green (G), blue (B), and green (G), respectively. These unit patterns are two-dimensionally and repeatedly arranged in the first direction (X direction) and the second direction (Y direction). For this color arrangement, two green pixels may be placed in one diagonal direction within a unit pattern in the form of a 2×2 array, and one blue pixel and one red pixel may be placed in the other diagonal direction, respectively. In other words, a first row in which a plurality of green pixels and a plurality of blue pixels are alternately arranged along the first direction, and a second row in which a plurality of red pixels and a plurality of green pixels are alternately arranged along the first direction may be repeatedly arranged along the second direction.

Hereinbelow, it has been described that a pixel array PXA" of the image sensor 200 has a Bayer pattern, but the operating principle may also be applied to pixel arrangements of the other patterns other than the Bayer pattern (e.g., quad Bayer pattern, quad square Bayer pattern, etc.).

The pixel array PXA" of the image sensor 200 may be equipped with a color separation lens array that condenses light of a color to correspond to this color arrangement, that is, light of a color corresponding to a specific pixel.

Referring to FIG. 3E, a sensor substrate SUB may include a plurality of pixels that sense incident light. The sensor substrate SUB may include a plurality of unit pixel groups PXA_G. The unit pixel group PXA_G may include a first subgroup pixel 111, a second subgroup pixel 112, a third subgroup pixel 113, and a fourth subgroup pixel 114 that convert incident light into an electrical signal to generate an image signal. The unit pixel group PXA_G may have a pixel arrangement in the form of a Bayer pattern. That is, the first subgroup pixel 111 and the fourth subgroup pixel 114 may be green pixels that detect green light, the second subgroup pixel 112 may be red pixels that detect red light, and the third subgroup pixel 113 may be blue pixels that detect blue light. Each of the first subgroup pixel 111, the second subgroup pixel 112, the third subgroup pixel 113, and the fourth subgroup pixel 114 may include a plurality of light sensing cells that independently sense incident light. For example, each of the first subgroup pixel 111, the second subgroup pixel 112, the third subgroup pixel 113, and the fourth subgroup pixel 114 may include a first light sensing cell ce1, a second light sensing cell ce2, a third light sensing cell ce3, and a fourth light sensing cell ce4. The first light sensing cell ce1, the second light sensing cell ce2, the third light sensing cell ce3, and the fourth light sensing cell ce4 may be two-dimensionally arranged in the first direction (X direction) and the second direction (Y direction). For example, in each of the first subgroup pixel 111, the second subgroup pixel 112, the third subgroup pixel 113, and the fourth subgroup pixel 114, the first light sensing cell ce1, the second light sensing cell ce2, the third light sensing cell ce3, and the fourth light sensing cell ce4 may be arranged in a 2×2 array form.

FIG. 3E illustrates that each of the first subgroup pixel 111, the second subgroup pixel 112, the third subgroup pixel 113, and the fourth subgroup pixel 114 includes four light sensing cells, but four or more independent light sensing cells may be clustered and arranged in two dimensions. For example, each of the first subgroup pixel 111, the second subgroup pixel 112, the third subgroup pixel 113, and the fourth subgroup pixel 114 may include a plurality of independent light sensing cells arranged in a cluster in the form of a 4×4 array, such as the pixel array PXA' of the image sensor described with FIG. 3B. Hereinafter, for convenience, a case in which each of the first subgroup pixel 111, the second subgroup pixel 112, the third subgroup pixel 113, and the fourth subgroup pixel 114 includes light sensing cells arranged in the form of a 2×2 array will be described.

According to an embodiment, a plurality of pixels including a plurality of light sensing cells that sense light of the same color may be used as auto-focus pixels. In the auto-focus pixel, an auto-focus signal may be obtained from a difference between output signals of adjacent photo-sensing cells. For example, an auto-focus signal in the first direction (X direction) may be generated from a difference between the output signal of the first light sensing cell ce1 and the output signal of the second light sensing cell ce2, a difference between the output signal of the third light sensing cell ce3 and the output signal of the fourth light sensing cell ce4, or a difference between a sum of the output signals of the first light sensing cell ce1 and the third light sensing cell ce3 and a sum of the output signals of the second light sensing cell ce2 and the fourth light sensing cell ce4. For example, an auto-focus signal in the second direction (Y direction) may be generated from a difference between the output signal of the first light sensing cell ce1 and the output signal of the third light sensing cell ce3, a difference between the output signal of the second light sensing cell ce2 and the output signal of the fourth light sensing cell ce4, or a difference between a sum of the output signals of the first light sensing cell ce1 and the second light sensing cell ce2 and a sum of the output signals of the third light sensing cell ce3 and the fourth light sensing cell ce4.

There are a sum mode and a full mode as methods of obtaining general image signals. In the sum mode, an image signal may be obtained by summing the output signals of the first light sensing cell ce1, the second light sensing cell ce2, the third light sensing cell ce3, and the fourth light sensing cell ce4. For example, the output signals of the first light sensing cell ce1, the second light sensing cell ce2, the third light sensing cell ce3, and the fourth light sensing cell ce4 of the first subgroup pixel 111 are summed to generate a first green image signal, the output signals of the first light sensing cell ce1, the second light sensing cell ce2, the third light sensing cell ce3, and the fourth light sensing cell ce4 of the second subgroup pixel 112 are summed to generate a red image signal, the output signals of the first light sensing cell ce1, the second light sensing cell ce2, the third light sensing cell ce3, and the fourth light sensing cell ce4 of the third subgroup pixel 113 are summed to generate a blue image signal, and the output signals of the first light sensing cell ce1, the second light sensing cell ce2, the third light sensing cell ce3, and the fourth light sensing cell ce4 of the fourth subgroup pixel 114 are summed to generate a second green image signal. In a full mode, each of the first light sensing cell ce1, the second light sensing cell ce2, the third light sensing cell ce3, and the fourth light sensing cell ce4 is used to obtain each output signal as each individual pixel. In this case, an image of a high resolution may be obtained.

A first photo-sensing cell c1, a second photo-sensing cell c2, a third photo-sensing cell c3, and a fourth photo-sensing cell c4 may be electrically separated by an isolation structure DTI. The isolation structure may be formed in, for example, a deep trench isolation structure. The deep trench may be filled with air or an electrically insulating material. After the light sensing layer is formed, an isolation structure DTI may be formed on the light sensing layer to form a plurality of electrically separated cells. The isolation structure electrically separates the first subgroup pixel 111, the second subgroup pixel 112, the third subgroup pixel 113, and the fourth subgroup pixel 114 and also electrically separates each of the first subgroup pixel 111, the second subgroup pixel 112, the third subgroup pixel 113, and the fourth subgroup pixel 114 into four regions. Among the isolation structures DTI, the cross-shaped separation lines SL shown in the drawing, in particular, are included in each of the first subgroup pixel 111, the second subgroup pixel 112, the third subgroup pixel 113, and the fourth subgroup pixel 114, indicating DTI center lines that separate each of the first subgroup pixel 111, the second subgroup pixel 112, the third subgroup pixel 113, and the fourth subgroup pixel 114 into a plurality of the first light sensing cell ce1, the second light sensing cell ce2, the third light sensing cell ce3, and the fourth light sensing cell ce4. In the drawings, the isolation structure DTI is indicated as a solid line with substantially no thickness, but this is a convenience illustration, and the isolation structure DTI has a thickness where adjacent light sensing cells are physically spaced apart. The isolation structure DTI included in the first subgroup pixel 111, the second subgroup pixel 112, the third subgroup pixel 113, and the fourth subgroup pixel 114 is a region that does not sense light, so a method of reducing performance degradation caused by the isolation structure may be considered in the design of a meta-prism array to be described herein.

Referring to FIG. 3F, a meta-prism array MP includes a plurality of pixel corresponding regions. The meta-prism array MP includes a plurality of pixel corresponding groups MP_G, which correspond to the plurality of unit pixel groups PXA_G of the sensor substrate SUB shown in FIG. 3E, respectively. The pixel corresponding group MP_G includes first to fourth subgroup pixel corresponding regions 131, 132, 133, and 134, which correspond to the first to fourth subgroup pixels 111, 112, 113 and 114, respectively. Each of a first subgroup pixel corresponding region 131, a second subgroup pixel corresponding region 132, a third subgroup pixel corresponding region 133, and a fourth subgroup pixel corresponding region 134 includes a plurality of nanoposts. The plurality of nanoposts are configured to separate incident light according to a wavelength and condense the incident light into the first subgroup pixel 111, the second subgroup pixel 112, the third subgroup pixel 113, and the fourth subgroup pixel 114 corresponding to each wavelength. As described in FIG. 3E, the first subgroup pixel 111 and the fourth subgroup pixel 114 may be the first green pixel and the second green pixel, respectively, and the second subgroup pixel 112 may be the red pixel and the third subgroup pixel 113 may be the blue pixel.

The shape and arrangement of the plurality of nanoposts provided in the meta-prism array MP may be determined to form a phase distribution suitable for this wavelength separation.

Figure 4A:
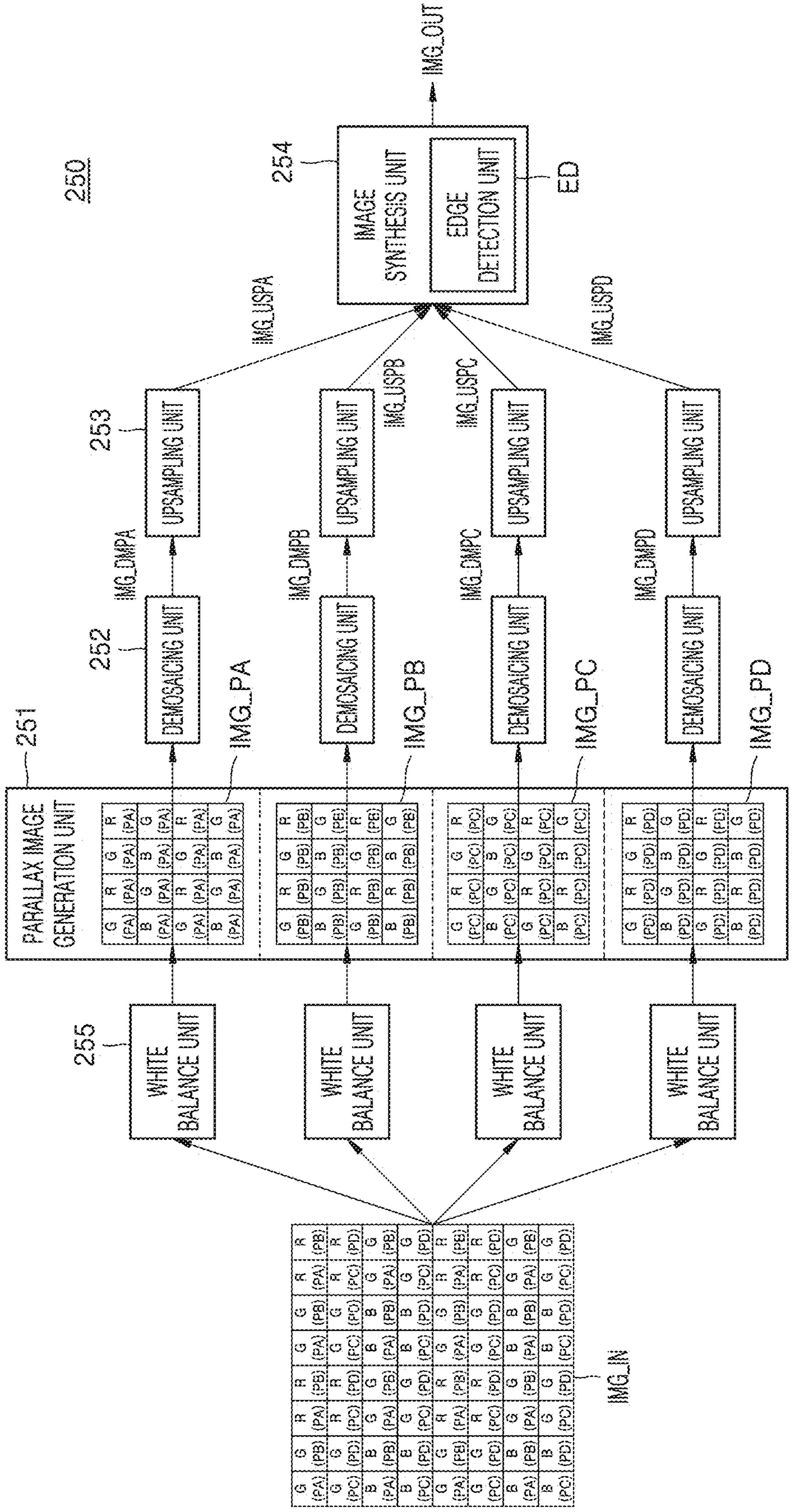
FIG. 4A is a diagram illustrating a method of performing a demosaicing processing in an image acquisition apparatus including a quad Bayer pattern.
Figure 4B:
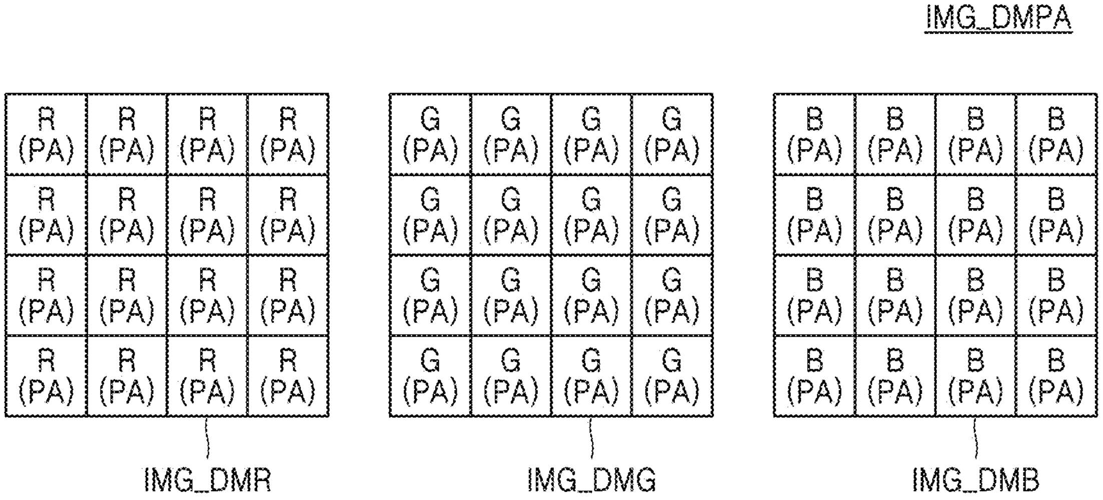
FIG. 4B is a diagram illustrating RGB demosaic images generated by a demosaicing unit for a parallax A illustrated in FIG. 4A.
Figure 4C:
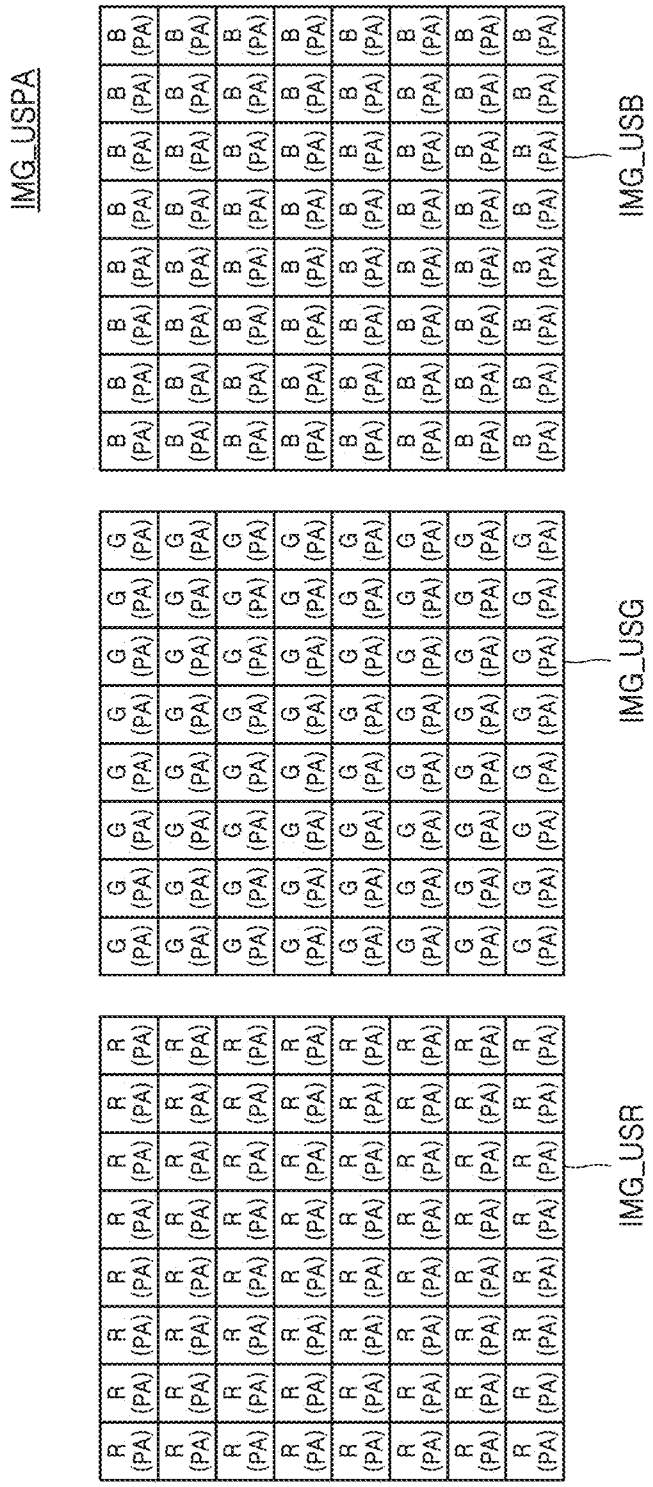
FIG. 4C is a diagram illustrating upsampling images generated by an upsampling unit for the parallax A illustrated in FIG. 4A.
Figure 5:
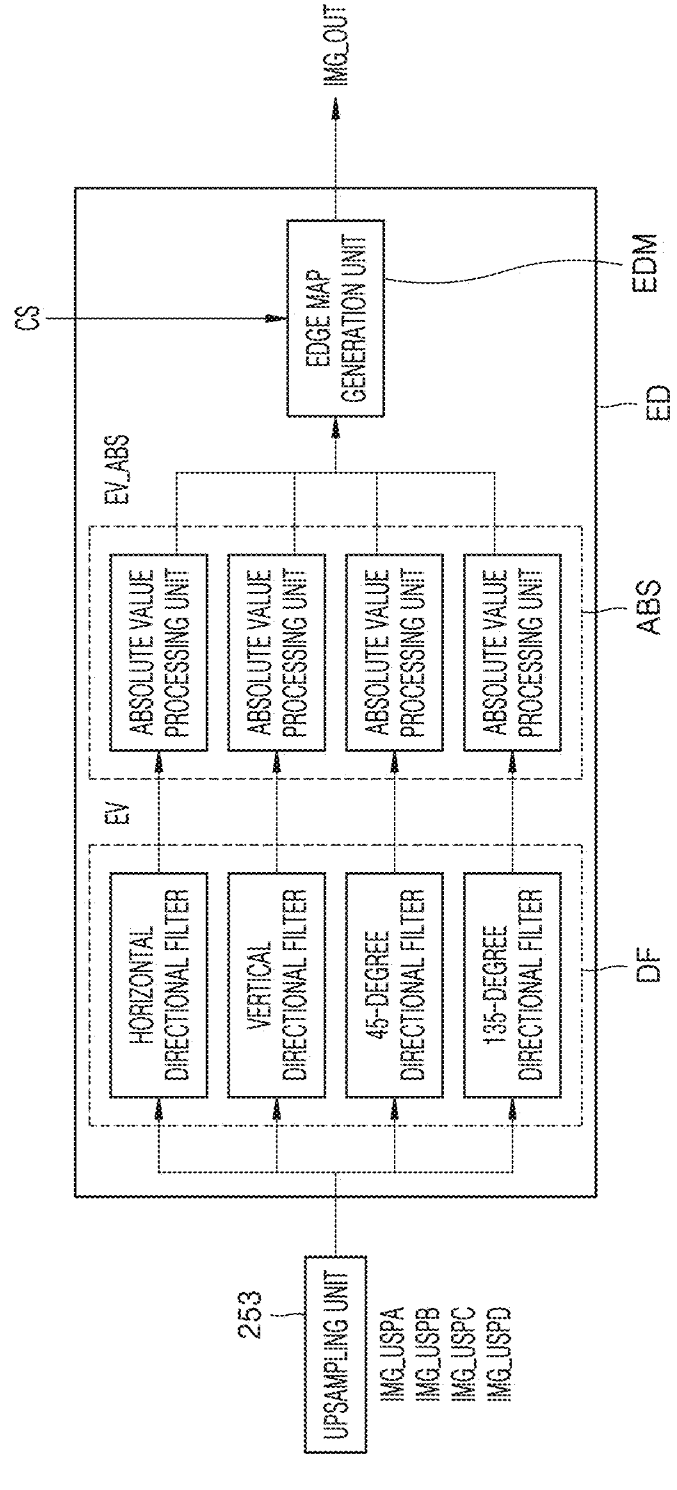
FIG. 5 is a schematic block diagram for describing an edge detection unit according to an embodiment.
Figure 6:
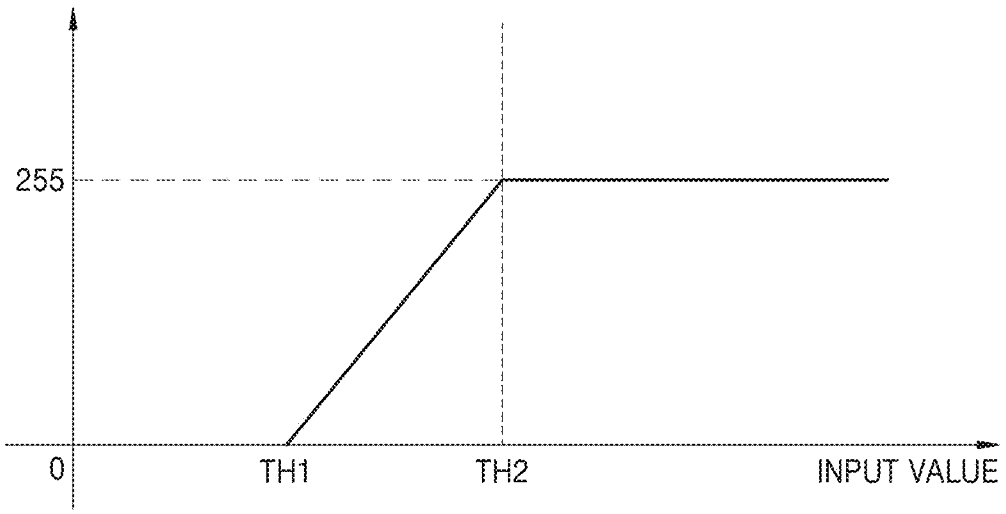
FIG. 6 is a graph illustrating a method of generating an edge map.

FIG. 4A is a diagram illustrating a method of performing a demosaicing processing in an image acquisition apparatus including a quad Bayer pattern. FIG. 4B is a diagram illustrating RGB demosaic images generated by a demosaicing unit for a parallax A illustrated in FIG. 4A. FIG. 4C is a diagram illustrating upsampling images generated by an upsampling unit for the parallax A illustrated in FIG. 4A. FIG. 5 is a schematic block diagram for describing an edge detection unit according to an embodiment. FIG. 6 is a graph illustrating a method of generating an edge map.

Referring to FIG. 1, FIG. 2, FIG. 3A, FIG. 3B, FIG. 3C, FIG. 3D, FIG. 3E, FIG. 3F, FIG. 4A, FIG. 4B, and FIG. 4C, the processor 250 according to an embodiment may include a parallax image generation unit 251, demosaicing units 252, upsampling units 253, and an image synthesis unit 254.

The processor 250 may receive an input image IMG_IN from the image sensor 200. The pixel array PXA of the image sensor 200 according to an embodiment may have a quad Bayer pattern structure, as illustrated in FIG. 3A. Accordingly, the input image IMG_IN may include 4×4 sub-images consisting of 2×2 green (G) sub-image PA, sub-image PB, sub-image PC, and sub-image PD, 2×2 red (R) sub-image PA, sub-image PB, sub-image PC, and sub-image PD, 2×2 blue (B) sub-image PA, sub-image PB, sub-image PC, and sub-image PD, and 2×2 green (G) sub-image PA, sub-image PB, sub-image PC, and sub-image PD. In this case, since the sub-image PA, sub-image PB, sub-image PC, and sub-image PD of the same color share one microlens ML (or a meta-prism array MP), they may include four parallaxes. That is, the sub-image PA, the sub-image PB, the sub-image PC, and the sub-image PD may have a parallax A, a parallax B, a parallax C, and a parallax D, respectively.

The parallax image generation unit 251 extracts and combines the sub-image PA, the sub-image PB, the sub-image PC, and the sub-image PD having the same parallax from the input image IMG_IN, thereby generating a plurality of parallax images including a parallax image IMG_PA, a parallax image IMG_PB, a parallax image IMG_PC, and a parallax image IMG_PD.

The parallax A image IMG_PA is generated by extracting and combining the sub-image PA, the sub-image PB, the sub-image PC, and the sub-image PD having a parallax A in the input image IMG_IN, the parallax B image IMG_PB is generated by extracting and combining the sub-image PA, the sub-image PB, the sub-image PC, and the sub-image PD having a parallax B in the input image IMG_IN, the parallax C image IMG_PC is generated by extracting and combining the sub-image PA, the sub-image PB, the sub-image PC, and the sub-image PD having a parallax C in the input image IMG_IN, and the parallax D image IMG_PD is generated by extracting and combining the sub-image PA, the sub-image PB, the sub-image PC, and the sub-image PD having a parallax D in the input image IMG_IN.

The parallax A image IMG_PA, the parallax B image IMG_PB, the parallax C image IMG_PC, and the parallax D image IMG_PD may have a Bayer pattern structure in which unit pixels are repeated in two dimensions in the first and second directions, in four quadrant regions, the unit pixels consisting of blue pixels, green pixels, red pixels, and green pixels, respectively. Accordingly, the demosaicing units 252, which will be described later, may perform demosaicing the parallax image IMG_PA, the parallax image IMG_PB, the parallax image IMG_PC, and the parallax image IMG_PD by using the conventional demosaicing methods designed for the Bayer pattern structure. In other words, it is possible to generate a high-quality output image IMG_OUT while minimizing the logic for correcting different parallaxes of quad Bayer patterns including microlenses ML (or meta-prism arrays MP), to thereby expect an effect of cost savings.

Each of the parallax A image IMG_PA, the parallax B image IMG_PB, the parallax C image IMG_PC, and the parallax D image IMG_PD is an image corresponding to only one of the four parallaxes. Therefore, the size of each of the parallax A image IMG_PA, the parallax B image IMG_PB, the parallax C image IMG_PC, and the parallax D image IMG_PD may correspond to one-fourth size compared to that of an input image IMG_IN.

The parallax A image IMG_PA, the parallax B image IMG_PB, the parallax C image IMG_PC, and the parallax D image IMG_PD may be stored in separate memories for quick access. However, the embodiments are not limited thereto, and for example, the input image IMG_IN may be separated by each parallax and directly input to the demosaicing unit 252 without a process of storing the input image in a separate memory.

The demosaicing units 252 may interpolate a color value of an empty pixel for each of the parallax image IMG_PA, the parallax image IMG_PB, the parallax image IMG_PC, and the parallax image IMG_PD by using color values of the neighboring pixels, thereby generating RGB demosaic images including a demosaic image IMG_DMR, a demosaic image IMG_DMG, and a demosaic image IMG_DMB.

The demosaicing units 252 may interpolate each of the parallax image IMG_PA, the parallax image IMG_PB, the parallax image IMG_PC, and the parallax image IMG_PD output in a Bayer pattern. For convenience of explanation, although FIG. 4B illustrates only a parallax A RGB demosaic image IMG_DMPA including RGB demosaic images such as the demosaic image IMG_DMR, the demosaic image IMG_DMG, and the demosaic image IMG_DMB, a parallax B RGB demosaic image IMG_DMPB, a parallax C RGB demosaic image IMG_DMPC, and a parallax D RGB demosaic image IMG_DMPD may be also generated in the same manner. In other words, each of the parallax B RGB demosaic images IMG_DMPB, the parallax C RGB demosaic image IMG_DMPC, and the parallax D RGB demosaic image IMG_DMPD may include RGB demosaic images such as the demosaic image IMG_DMR, the demosaic image IMG_DMG, and the demosaic image IMG_DMB.

The interpolation method may adopt a conventional demosaicing method designed for a Bayer pattern structure. For example, the interpolation method may adopt average value interpolation, linear interpolation, cubic interpolation, directional bi-linear interpolation, and the like, but is not limited thereto.

In the Bayer pattern, half of the total number of pixels is green, and the remaining pixels are equally allocated as red or blue. Each pixel in this pattern is sensitive to only one color, i.e., R, G, or B. Therefore, color images obtained using these patterns are interpolated in three color channels to generate full-color images, which is called demosaicing.

Demosaicing, or color filter array (CFA) interpolation, is a process of reconstructing unknown R, G, and B components to generate full-color images. Two unknown colors of each pixel are estimated by various demosaicing algorithms. The demosaicing algorithm reconstructs full-color images from incomplete data, i.e., two missing data in each pixel. This reconstruction algorithm uses inter-channel and intra-channel correlation of data available in RGB channels.

According to an embodiment, the demosaicing units 252, as illustrated in FIG. 4A, is composed of a plurality of logics arranged in parallel, and may simultaneously interpolate a parallax A image IMG_PA, parallax B image IMG_PB, parallax C image IMG_PC, and parallax D image IMG_PD in parallel. In this case, a fast demosaicing process may be expected.

However, the arrangement of the logic constituting the demosaicing unit 252 is not limited thereto. For example, the demosaicing units 252 may be configured as a single logic, and may sequentially interpolate the parallax A image IMG_PA, parallax B image IMG_PB, parallax C image IMG_PC, and parallax D image IMG_PD. In this case, the hardware area occupied by logic is reduced, and product miniaturization and cost reduction effects may be expected.

The upsampling units 253 upsample a parallax A RGB demosaic image IMG_DMPA, a parallax B RGB demosaic image IMG_DMPB, a parallax C RGB demosaic image IMG_DMPC, and a parallax D RGB demosaic image IMG_DMPD to a size of the input image IMG_IN, respectively, thereby generating upsampled image IMG_USPA, the upsampled image IMG_USPB, the upsampled image IMG_USPC, and the upsampled image IMG_USPD for respective ones of the parallax A, the parallax B, the parallax C, and the parallax D. For example, the upsampling method may adopt bi-linear interpolation, bi-cubic interpolation, deep learning network, etc., but is not limited to these methods.

The reason why upsampling is required is that the sizes of the RGB demosaic image IMG_DMPA, the RGB demosaic image IMG_DMPB, the RGB demosaic image IMG_DMPC, and the RGB demosaic image IMG_DMPD for the respective parallaxes A, B, C, and D are ¼ with respect to the size of a full mode Input Image IMG_IN.

The image synthesis unit 254 may generate an output image IMG_OUT by weighted-summing a reference upsampled image, e.g., IMG_USPA selected from an upsampled image IMG_USPA, an upsampled image IMG_USPB, an upsampled image IMG_USPC, and an upsampled image IMG_USPD for the respective parallaxes A, B, C, and D, and the remaining upsampled images, e.g., the upsampled image IMG_USPB, the upsampled image IMG_USPC, and the upsampled image IMG_USPD, based on a similarity therebetween. The image synthesis unit 254 may determine a similarity between the reference upsampled image (e.g., the upsampled image IMG_USPA), and the remaining images (e.g., the upsampled image IMG_USPB, the upsampled image IMG_USPC, and the upsampled image IMG_USPD), by using one of a sum of absolute differences (SAD), a sum of squared differences (SSD), normalized cross correlation (NCC), and zero-mean normalized cross correlation (ZNCC).

The image synthesis unit 254 may generate one image by synthesizing the upsampled image IMG_USPA, the upsampled image IMG_USPB, the upsampled image IMG_USPC, and the upsampled image IMG_USPD for the parallax A, the parallax B, the parallax C, and the parallax D, respectively. In the conventional image synthesis process, it was common to synthesize the remaining images after local/global alignment for a specific image. According to an inventive concept of embodiments herein, a similarity between the reference upsampled image (e.g., the upsampled image IMG_USPA), and the remaining images (e.g., the upsampled image IMG_USPB, the upsampled image IMG_USPC, and the upsampled image IMG_USPD), may be determined without performing such parallax correction. Accordingly, when the similarity is low, a method of synthesizing an image with a low weight value is used, and when the similarity is high, a method of synthesizing an image with a high weight value is used. For this reason, high-quality image quality may be obtained by removing the mismatch region caused by different parallaxes while maintaining the resolution of the focused position without considering complex parallaxes.

The image synthesis unit 254 may further include an edge detection unit ED that detects an aliasing region of the upsampled image IMG_USPA, the upsampled image IMG_USPB, the upsampled image IMG_USPC, and the upsampled image IMG_USPD for the respective parallaxes of the parallax A, the parallax B, the parallax C, and the parallax D.

Referring to FIG. 5, an edge detection unit ED according to an embodiment may include a plurality of directional filters DF, an absolute value processing unit ABS, and an edge map generation unit EDM.

Directional filters DF may detect edges (or edge result values EV) by applying, according to each direction, high pass filters (e.g., HPFs of 1, −2, and 1) to the upsampled image IMG_USPA, the upsampled image IMG_USPB, the upsampled image IMG_USPC, and the upsampled image IMG_USPD for the respective parallaxes of the parallax A, the parallax B, the parallax C, and the parallax D. The directional filters DF include a horizontal directional filter, a vertical directional filter, a 45-degree directional filter, and a 135-degree directional filter.

The edge result values EV are calculated by removing the baseband from the signal, and thus may have a positive value as well as a negative value. Accordingly, the absolute value processing unit ABS needs to absolute-process the edge result values EV to calculate the edge absolute value EV_ABS.

The edge map generation unit EDM may generate an edge map using an input value determined based on the edge absolute value EV_ABS and a control signal CS.

In this case, the control signal may include: a first control signal for generating the edge map by using, as the input value, a maximum value among an edge absolute value EV_ABS of the horizontal directional filter, an edge absolute value EV_ABS of the vertical directional filter, an edge absolute value EV_ABS of the 45-degree directional filter, and an edge absolute value EV_ABS of the 135-degree directional filter; a second control signal for generating the edge map by using, as the input value, an average value of the edge absolute value EV_ABS of the horizontal directional filter, the edge absolute value EV_ABS of the vertical directional filter, the edge absolute value EV_ABS of the 45-degree directional filter, and the edge absolute value EV_ABS of the 135-degree directional filter; and a third control signal for generating the edge map by using, as the input value, a maximum value of a weighted average value of the edge absolute value EV_ABS of the horizontal directional filter and the edge absolute value EV_ABS of the vertical directional filter and a weighted average value of the edge absolute value EV_ABS of the 45-degree directional filter, and the edge absolute value EV_ABS of the 135-degree directional filter.

Referring to FIG. 6, when the input value is less than a first threshold value TH1, the edge map generation unit EDM may determine that the input value is not an edge (i.e., an alpha value 0), when the input value is greater than a second threshold value TH2, the edge map generation unit EDM may determine that the input value is an edge (i.e., an alpha value 255), and when the input value is between the first threshold value TH1 and the second threshold value TH2, linear interpolation may be performed to prevent a sudden change in the alpha value.

The image synthesis unit 254 may allocate a high weight value in the aliasing region detected by the edge detection unit ED, even if the similarity between the reference upsampled image (e.g., the upsampled image IMG_USPA) and the remaining upsampling images (e.g., the upsampled image IMG_USPB, the upsampled image IMG_USPC, the upsampled image IMG_USPD) is low. In general, since the high frequency region where aliasing occurs is likely to be a region determined as an edge (i.e., an alpha value of 255), allocating a high weight value may be effective in generating a high-definition output image IMG_OUT even if the similarity between images is determined to be low for that region.

Referring back to FIG. 4A, the processor 250 may further include white balance units 255 that process white balance of the input image IMG_IN at the front end of the parallax image generation unit 251.

The white balance is to adjust the gain of R and B around G so that the ratio of RGB (Red, Green, Blue) in the gray region is the same under various color temperature lighting (e.g., R=G=B). Conceptually, the white balance is intended to normalize the lighting effect of the captured scene so that all objects appear to be captured under the ideal "white light."

In this case, the white balance units 255 may apply the same parameters to all four parallax images, the parallax image IMG_PA, the parallax image IMG_PB, the parallax image IMG_PC, and the parallax image IMG_PD, during white balance processing. However, when the image sensor 200 includes a meta-prism array MP, different parameters may be applied to four sheets of the parallax image IMG_PA, the parallax image IMG_PB, the parallax image IMG_PC, and the parallax image IMG_PD to improve the sensitivity of the image sensor. For example, gains may be applied differently to four sheets of parallax images.

Hereinafter, other embodiments will be described. In the following embodiments, the same components as those of the embodiment described above will be omitted or simplified, and differences will be mainly described.

Figure 7:
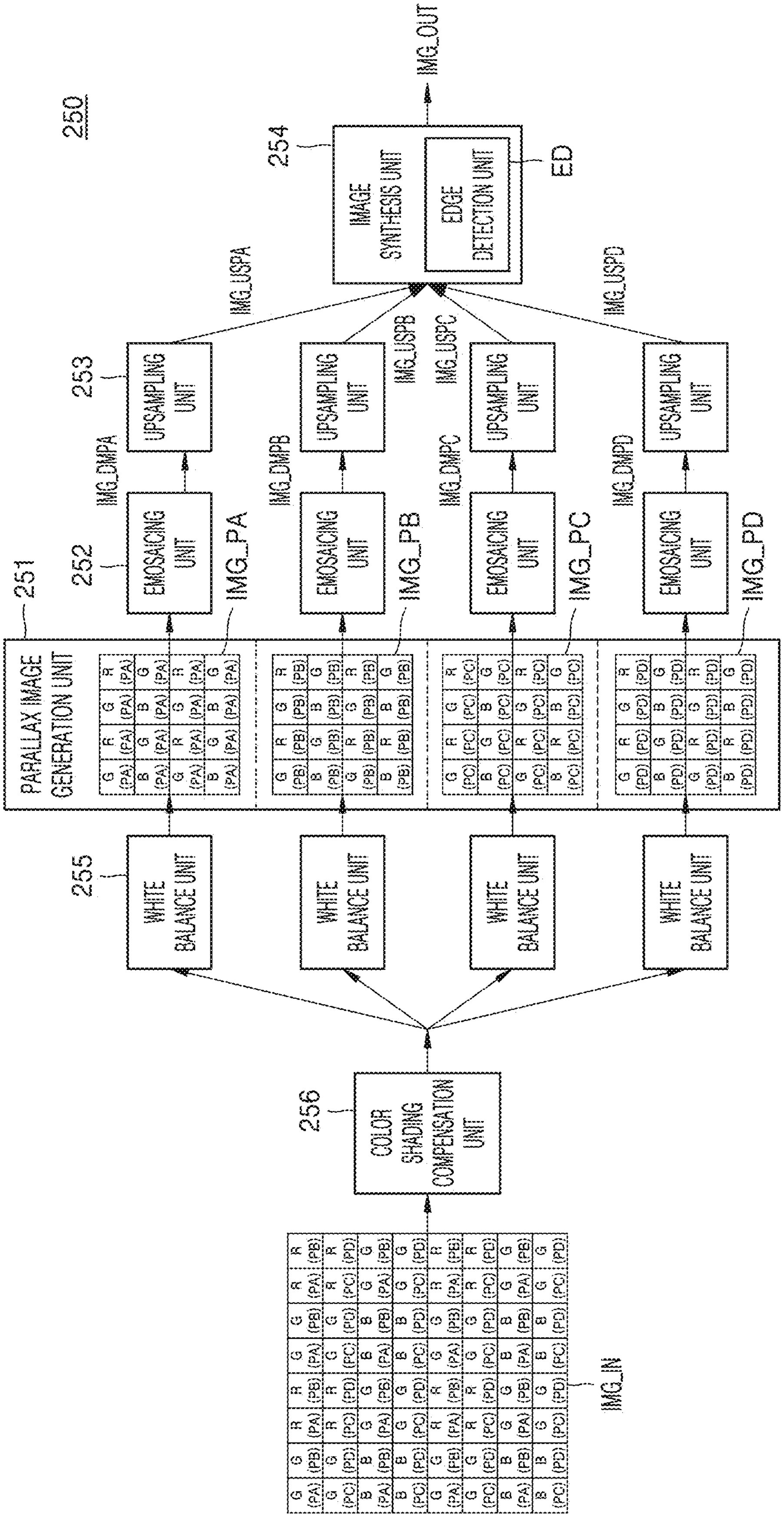
FIG. 7 is a diagram illustrating a method of performing a demosaicing processing in an image acquisition apparatus including a color shading compensation unit.

FIG. 7 is a diagram illustrating a method of performing a demosaicing processing in an image acquisition apparatus including a color shading compensation unit.

Referring to FIG. 1, FIG. 2, FIG. 3A, FIG. 3B, FIG. 3C, FIG. 3D, FIG. 3E, FIG. 3F, FIG. 4A, FIG. 4B, FIG. 4C, FIG. 5, FIG. 6, and FIG. 7, the processor 250 shown in FIG. 7 is different from the processor 250 shown in FIG. 4A in that the former further includes a color shading compensation unit 256 that compensates for color shading of the input image IMG_IN at the front end of the white balance units 255, and the remaining components between the former and the latter are substantially the same.

In the case of an image sensor in which a plurality of light receiving elements exist under a microlens ML (or meta-prism array MP), color shading correction may be performed first before image processing (e.g., demosaicing) the four sheets of the parallax image IMG_PA, the parallax image IMG_PB, the parallax image IMG_PC, and the parallax image IMG_PD.

Color shading means that as the channel characteristics of the color filter are different, color deviations occur between pixels of different channels among adjacent pixels. Color variations may exist in the same channel for various reasons between four pixels with the same color arranged in 2×2 (2 rows and 2 columns), such as a quad Bayer pattern.

In particular, when a microlens ML (or meta-prism array MP) is included, the color deviation may be larger within the same color of 2×2, so it may be desirable to first process color shading correction and perform demosaicing processing later.

The color shading compensation unit 256 may correct a color deviation between channels by applying correction gains of different values for each color channel. As an example, a correction gain function having different coefficients for each color channel is preset, and the color shading compensation unit 256 may correct the color deviation by applying the correction gain function for each channel to the pixel for each channel. In this case, the correction gain function for each channel may be a function of at least two dimensions or more. In addition to using the correction gain function as described above, various correction methods may be applied, such as using a lookup table that stores correction gain values for each channel.

Figure 8:
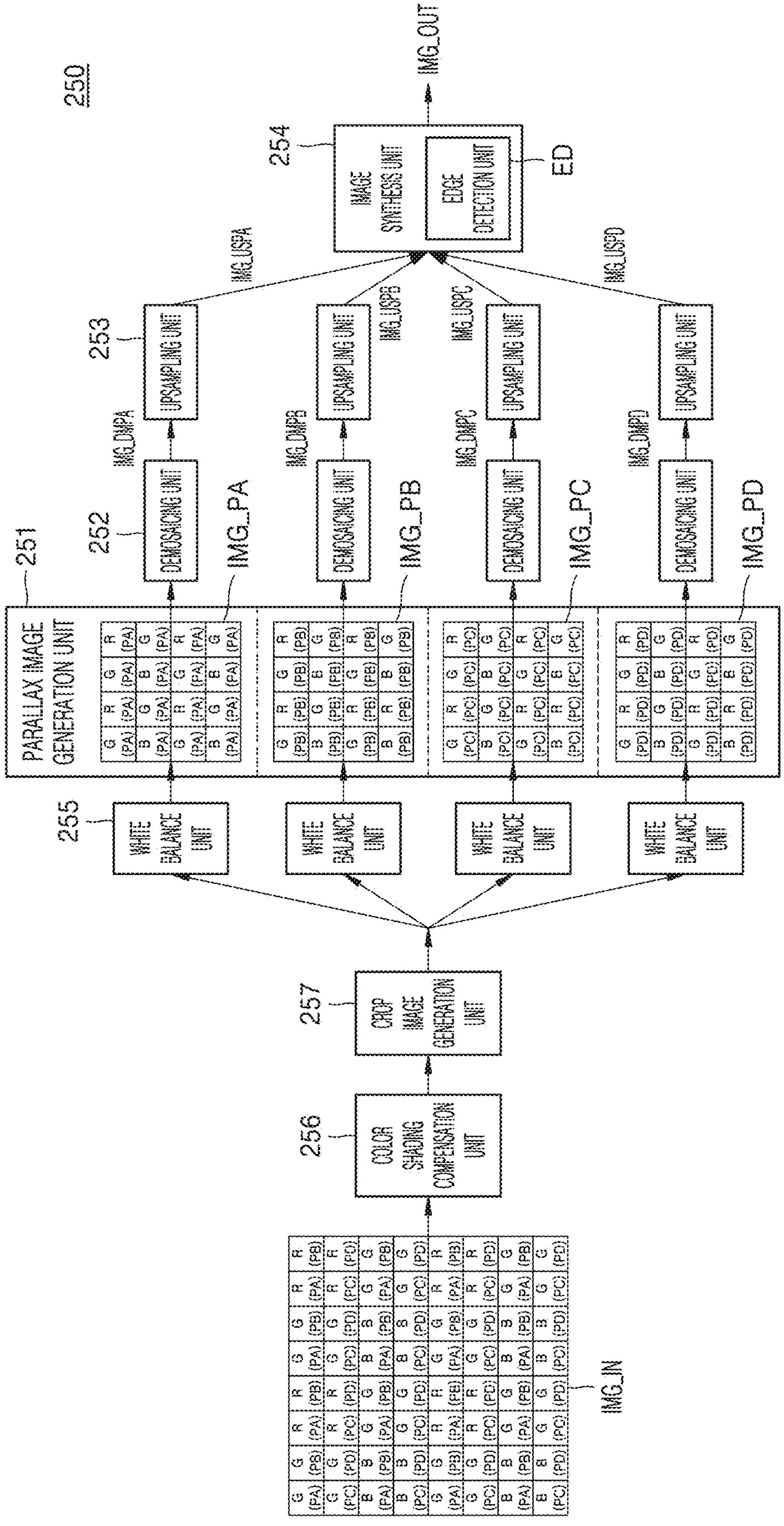
FIG. 8 is a diagram for describing a method of performing a demosaicing processing in an image acquisition apparatus including a crop image generation unit.

FIG. 8 is a diagram for describing a method of performing a demosaicing processing in an image acquisition apparatus including a crop image generation unit.

Referring to FIG. 1, FIG. 7, and FIG. 8, the processor 250 shown in FIG. 8 differs from the processor 250 shown in FIG. 7 in that the former further includes a crop image generation unit 257 between the color shading compensation unit 256 and the white balance units 255, and the remaining components between the former and the latter are substantially the same.

When using digital zoom within the image acquisition device 100, since the output format size of the image is the same, there is no need to process the entire enlarged large image, so only the target area that the user pays attention to may be cropped to perform image processing (e.g., demosaicing). According to an embodiment, the target area may be determined by a user's input.

Through this, the effect of reducing power consumption may be expected. In this case, since sensor correction such as color shading correction is difficult to adjust an address of a lookup table referring to when performing a crop processing, it may be desirable to perform crop processing after color shading correction.

Figure 9A:
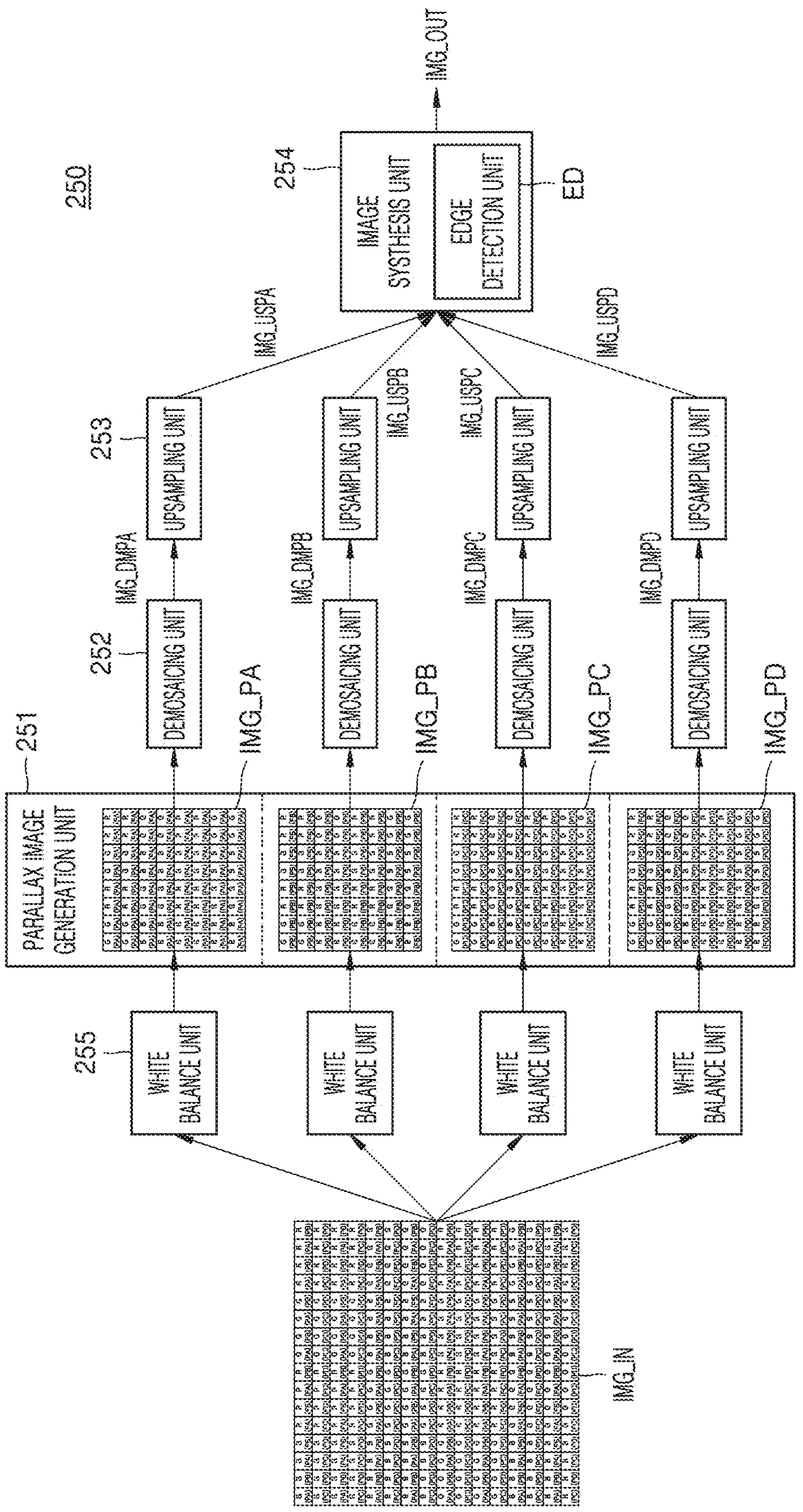
FIG. 9A is a diagram illustrating a method of performing a demosaicing processing in an image acquisition apparatus including a quad square Bayer pattern.
Figure 9B:
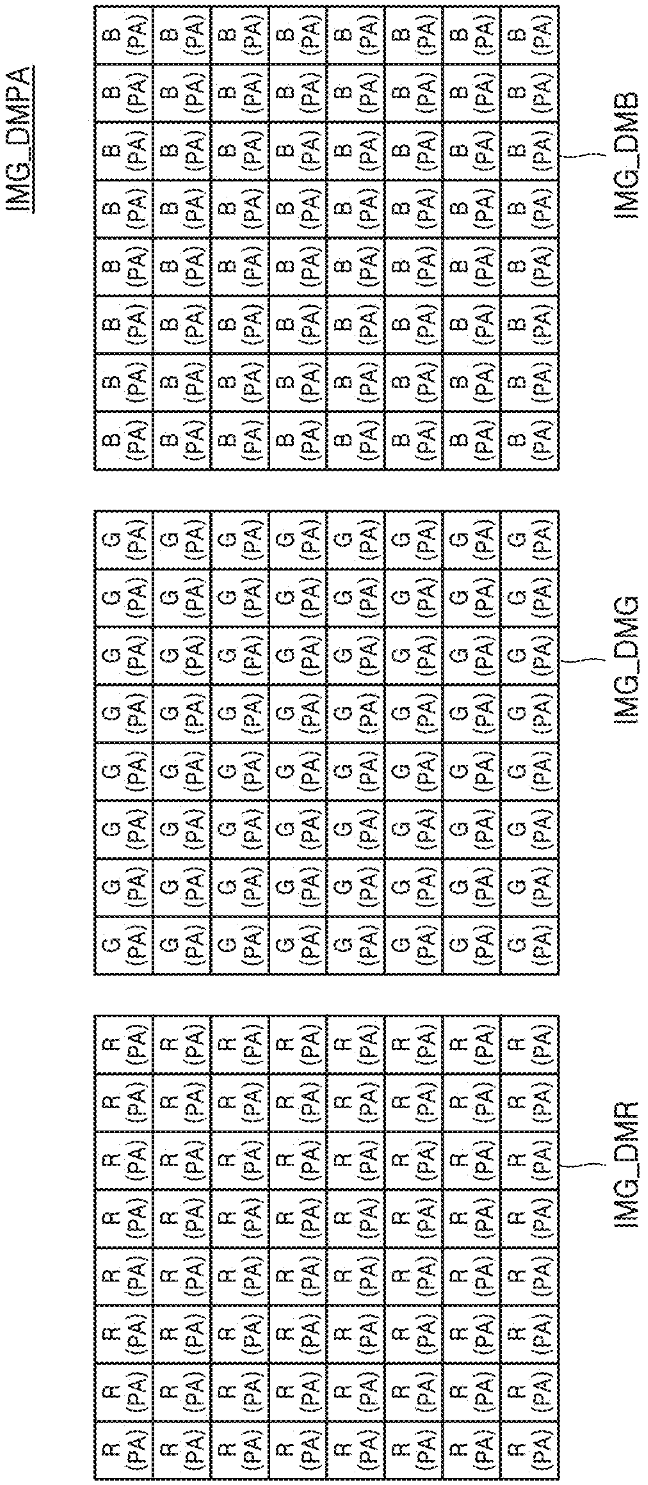
FIG. 9B is a diagram illustrating RGB demosaic images generated by a demosaicing unit for a parallax A illustrated in FIG. 9A.
Figure 9C:
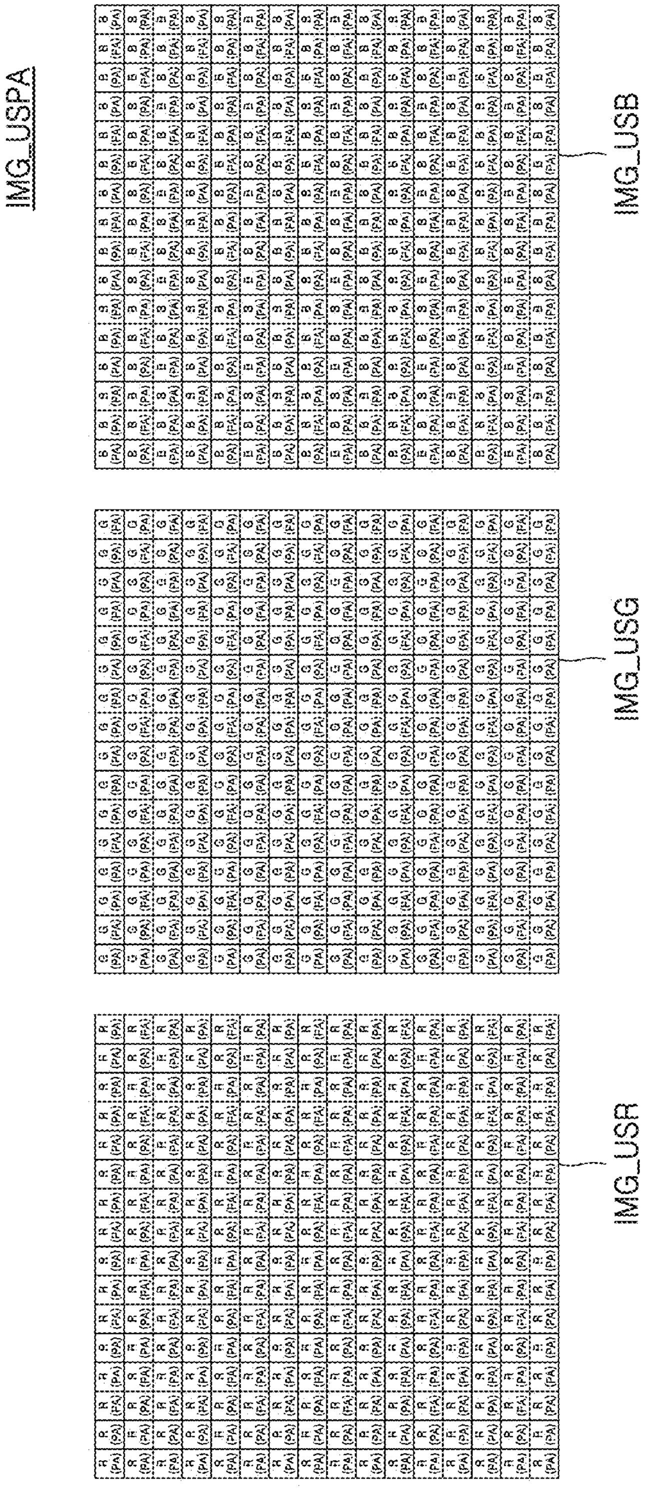
FIG. 9C is a diagram illustrating upsampling images generated by an upsampling unit for the parallax A illustrated in FIG. 9A.

FIG. 9A is a diagram illustrating a method of performing a demosaicing processing in an image acquisition apparatus including a quad square Bayer pattern. FIG. 9B is a diagram illustrating RGB demosaic images generated by a demosaicing unit for a parallax A illustrated in FIG. 9A. FIG. 9C is a diagram illustrating upsampled images generated by an upsampling unit for the parallax A illustrated in FIG. 9A.

FIG. 9A is a diagram illustrating a method of performing a demosaicing processing in an image acquisition apparatus including a quad square Bayer pattern. FIG. 9B is a diagram illustrating RGB demosaic images generated by a demosaicing unit for a parallax A illustrated in FIG. 9A. FIG. 9C is a diagram illustrating upsampled images generated by an upsampling unit for the parallax A illustrated in FIG. 9A. Referring to FIG. 1, FIG. 2, FIG. 3A, FIG. 3B, FIG. 3C, FIG. 3D, FIG. 3E, FIG. 3F, FIG. 4A, FIG. 4B, FIG. 4C, FIG. 5, FIG. 6, FIG. 7, FIG. 8, FIG. 9A, FIG. 9B, and FIG. 9C, the embodiment shown in FIG. 9A differs from the embodiment shown in FIG. 4A in that the input image IMG_IN of the former has a quad square Bayer pattern structure, and the input image IMG_IN of the latter has a quad Bayer pattern structure, and the remaining components between the former and the latter are substantially the same. Accordingly, although not explicitly described, the embodiment of FIG. 7 and FIG. 8 may also be applied to the embodiment of FIG. 9A.

The processor 250 according to an embodiment may include a parallax image generation unit 251, demosaicing units 252, upsampling units 253, and an image synthesis unit 254.

The processor 250 may receive an input image IMG_IN from the image sensor 200. The pixel array PXA of the image sensor 200 according to an embodiment may have a quad square Bayer pattern structure, as illustrated in FIG. 3B. Accordingly, the input image IMG_IN may include 8×8 sub-images consisting of 4×4 green (G) sub-images (the sub-image PA, the sub-image PB, the sub-image PC, and the sub-image PD)*4, 4×4 red (R) sub-images (the sub-image PA, the sub-image PB, the sub-image PC, and the sub-image PD)*4, 4×4 blue (B) sub-images (the sub-image PA, the sub-image PB, the sub-image PC, and the sub-image PD)*4, and 4×4 green (G) sub-images (the sub-image PA, the sub-image PB, the sub-image PC, and the sub-image PD)*4. In this case, since the sub-image PA, the sub-image PB, the sub-image PC, and the sub-image PD of the same color share one microlens ML (or a meta-prism array MP), they may include four parallaxes. That is, the sub-image PA, the sub-image PB, the sub-image PC, and the sub-image PD may have a parallax A, a parallax B, a parallax C, and a parallax D, respectively.

The parallax image generation unit 251 extracts and combines the sub-image PA, the sub-image PB, the sub-image PC, and the sub-image PD having the same parallax from the input image IMG_IN, thereby generating a plurality of parallax images such as the parallax image IMG_PA, the parallax image IMG_PB, the parallax image IMG_PC, and the parallax image IMG_PD.

The parallax A image IMG_PA is generated by extracting and combining the sub-image PA, the sub-image PB, the sub-image PC, and the sub-image PD having a parallax A in the input image IMG_IN, the parallax B image IMG_PB is generated by extracting and combining the sub-image PA, the sub-image PB, the sub-image PC, and the sub-image PD having a parallax B in the input image IMG_IN, the parallax C image IMG_PC is generated by extracting and combining the sub-image PA, the sub-image PB, the sub-image PC, and the sub-image PD having a parallax C in the input image IMG_IN, and the parallax D image IMG_PD is generated by extracting and combining the sub-image PA, the sub-image PB, the sub-image PC, and the sub-image PD having a parallax D in the input image IMG_IN.

Each of the parallax A image IMG_PA, the parallax B image IMG_PB, the parallax C image IMG_PC, and the parallax D image IMG_PD has a quad square Bayer pattern structure.

The size of each of the parallax A image IMG_PA, the parallax B image IMG_PB, the parallax C image IMG_PC, and the parallax D image IMG_PD may correspond to one-fourth size compared to that of an input image IMG_IN.

The parallax image generation unit 251 may provide, to the demosaicing units 252, the parallax image IMG_PA, the parallax image IMG_PB, the parallax image IMG_PC, and the parallax image IMG_PD each having a Bayer pattern structure rather than a quad square Bayer pattern structure. In this case, the parallax image generation unit 251 may divide the parallax image IMG_PA, the parallax image IMG_PB, the parallax image IMG_PC, and the parallax image IMG_PD each having a quad Bayer pattern structure into four Bayer patterns, respectively, and provide a total of 16 Bayer patterns to the demosaicing units 252. Accordingly, 16 times resizing rather than 4 times resizing may be required in the subsequent upsampling units 253.

The demosaicing units 252 may interpolate a color value of an empty pixel for each of the parallax image IMG_PA, the parallax image IMG_PB, the parallax image IMG_PC, and the parallax image IMG_PD by using color values of the neighboring pixels, thereby generating RGB demosaic images such as the demosaic image IMG_DMR, the demosaic image IMG_DMG, and the demosaic image IMG_DMB.

The demosaicing units 252 may interpolate each of the parallax image IMG_PA, the parallax image IMG_PB, the parallax image IMG_PC, and the parallax image IMG_PD output in a quad Bayer pattern. For convenience of explanation, although FIG. 9B illustrates only a parallax A RGB demosaic image IMG_DMPA including RGB demosaic images such as the demosaic image IMG_DMR, the demosaic image IMG_DMG, and the demosaic image IMG_DMB, a parallax B RGB demosaic image IMG_DMPB, a parallax C RGB demosaic image IMG_DMPC, and a parallax D RGB demosaic image IMG_DMPD may be also generated in the same manner. In other words, each of the parallax B RGB demosaic images IMG_DMPB, the parallax C RGB demosaic image IMG_DMPC, and the parallax D RGB demosaic image IMG_DMPD may include RGB demosaic images such as the demosaic image IMG_DMR, the demosaic image IMG_DMG, and the demosaic image IMG_DMB.

The upsampling units 253 upsample a parallax A RGB demosaic image IMG_DMPA, a parallax B RGB demosaic image IMG_DMPB, a parallax C RGB demosaic image IMG_DMPC, and a parallax D RGB demosaic image IMG_DMPD to a size of the input image IMG_IN, respectively, thereby generating up-sampled images such as the upsampled image IMG_USPA, the upsampled image IMG_USPB, the upsampled image IMG_USPC, and the upsampled image IMG_USPD for the respective parallaxes of the parallax A, the parallax B, the parallax C, and the parallax D. The reason why upsampling is required is that the sizes of the RGB demosaic images such as the RGB demosaic image IMG_DMPA, the RGB demosaic image IMG_DMPB, the RGB demosaic image IMG_DMPC, and the RGB demosaic image IMG_DMPD for the respective parallaxes, parallax A, the parallax B, the parallax C, and the parallax D, are ¼ with respect to the size of a full mode Input Image IMG_IN.

The image synthesis unit 254 may generate an output image IMG_OUT by weighted-summing a reference upsampled image, e.g., IMG_USPA selected from the upsampled image IMG_USPA, the upsampled image IMG_USPB, the upsampled image IMG_USPC, and the upsampled image IMG_USPD for the respective parallaxes, of the parallax A, the parallax B, the parallax C, and the parallax D, and the remaining upsampled images, e.g., the upsampled image IMG_USPB, the upsampled image IMG_USPC, and the upsampled image IMG_USPD, based on a similarity therebetween. The image synthesis unit 254 may generate one image by synthesizing up-sampled images such as the upsampled image IMG_USPA, the upsampled image IMG_USPB, the upsampled image IMG_USPC, and the upsampled image IMG_USPD for the parallax A, the parallax B, the parallax C, and the parallax D, respectively. According to the inventive concept, a similarity between the reference upsampled image (e.g., upsampled image IMG_USPA), and the remaining images (e.g., the upsampled image IMG_USPB, the upsampled image IMG_USPC, and the upsampled image IMG_USPD), may be determined without performing such parallax correction. Accordingly, when the similarity is low, a method of synthesizing an image with a low weight value is used, and when the similarity is high, a method of synthesizing an image with a high weight value is used. For this reason, high-quality image quality may be obtained by removing the mismatch region caused by different parallaxes while maintaining the resolution of the focused position without considering complex parallaxes.

The image synthesis unit 254 may further include an edge detection unit ED that detects an aliasing region of the upsampled image IMG_USPA, the upsampled image IMG_USPB, the upsampled image IMG_USPC, and the upsampled image IMG_USPD for the respective parallaxes of the parallax A, the parallax B, the parallax C, and the parallax D.

The image synthesis unit 254 may allocate a high weight value in the aliasing region detected by the edge detection unit ED, even if the similarity between the reference upsampled image (e.g., the upsampled image IMG_USPA) and the remaining upsampling images (e.g., the upsampled image IMG_USPB, the upsampled image IMG_USPC, and the upsampled image IMG_USPD) is low. In general, since the high frequency region where aliasing occurs is likely to be a region determined as an edge (i.e., an alpha value of 255), allocating a high weight value may be effective in generating a high-definition output image IMG_OUT even if the similarity between images is determined to be low for that region.

Referring back to FIG. 9A, the processor 250 may further include white balance units 255 that process white balance of the input image IMG_IN at the front end of the parallax image generation unit 251.

Figure 10:
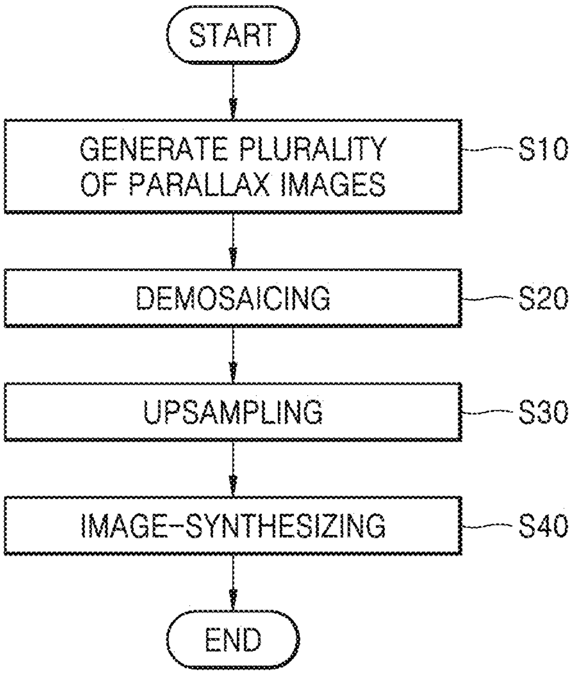
FIG. 10 is a flowchart illustrating a demosaicing method of an image acquisition apparatus including a color separation lens array.

FIG. 10 is a flowchart illustrating a demosaicing method of an image acquisition apparatus to which a color separation lens array is applied. In this case, some of the configurations described in FIG. 1, FIG. 2, FIG. 3A, FIG. 3B, FIG. 3C, FIG. 3D, FIG. 3E, FIG. 3F, FIG. 4A, FIG. 4B, FIG. 4C, FIG. 5, FIG. 6, FIG. 7, FIG. 8, FIG. 9A, FIG. 9B, and FIG. 9C are not explicitly shown in FIG. 10, but this is only for avoiding redundant descriptions and may be naturally applied thereto.

Referring to FIG. 1, FIG. 2, FIG. 3A, FIG. 3B, FIG. 3C, FIG. 3D, FIG. 3E, FIG. 3F, FIG. 4A, FIG. 4B, FIG. 4C, FIG. 5, FIG. 6, FIG. 7, FIG. 8, FIG. 9A, FIG. 9B, FIG. 9C, and FIG. 10, an image acquisition method according to an embodiment may include: an operation S10 of generating a plurality of parallax images such as the parallax image IMG_PA, the parallax image IMG_PB, the parallax image IMG_PC, and the parallax image IMG_PD by extracting and combining sub-images having the same parallax from an input image IMG_IN acquired by an image sensor 200; a demosaicing operation S20 of interpolating color values of empty pixels for respective parallax images of the parallax image IMG_PA, the parallax image IMG_PB, the parallax image IMG_PC, and the parallax image IMG_PD using color values of neighboring pixels; an upsampling operation S30 of generating a plurality of upsampled images such as the upsampled image IMG_USPA, the upsampled image IMG_USPB, the upsampled image IMG_USPC, and the upsampled image IMG_USPD by upsampling the respective interpolated parallax images such as the RGB demosaic image IMG_DMPA, the RGB demosaic image IMG_DMPB, the RGB demosaic image IMG_DMPC, and the RGB demosaic image IMG_DMPD to the size of the input image IMG_IN; and an image synthesis operation S40 of generating an output image IMG_OUT by weighted-summing one upsampled image selected from the upsampled images, such as the upsampled image IMG_USPA, the upsampled image IMG_USPB, the upsampled image IMG_USPC, and the upsampled image IMG_USPD, and the remaining upsampled images based on a similarity therebetween.

In this case, the image sensor 200 includes: a quad Bayer pattern array in which pixels arranged in a 2×2 matrix include respective color filters having the same color; or a quad square Bayer pattern array in which pixels arranged in a 4×4 matrix include respective color filters having the same color.

The image synthesis operation S40 may further include an edge detection operation that detects an aliasing region of the upsampled image IMG_USPA, the upsampled image IMG_USPB, the upsampled image IMG_USPC, and the upsampled image IMG_USPD.

In the image synthesis operation, a high weight may be allocated even if the similarity between the reference upsampled image and the remaining upsampled images is low in the aliasing region.

Figure 11:
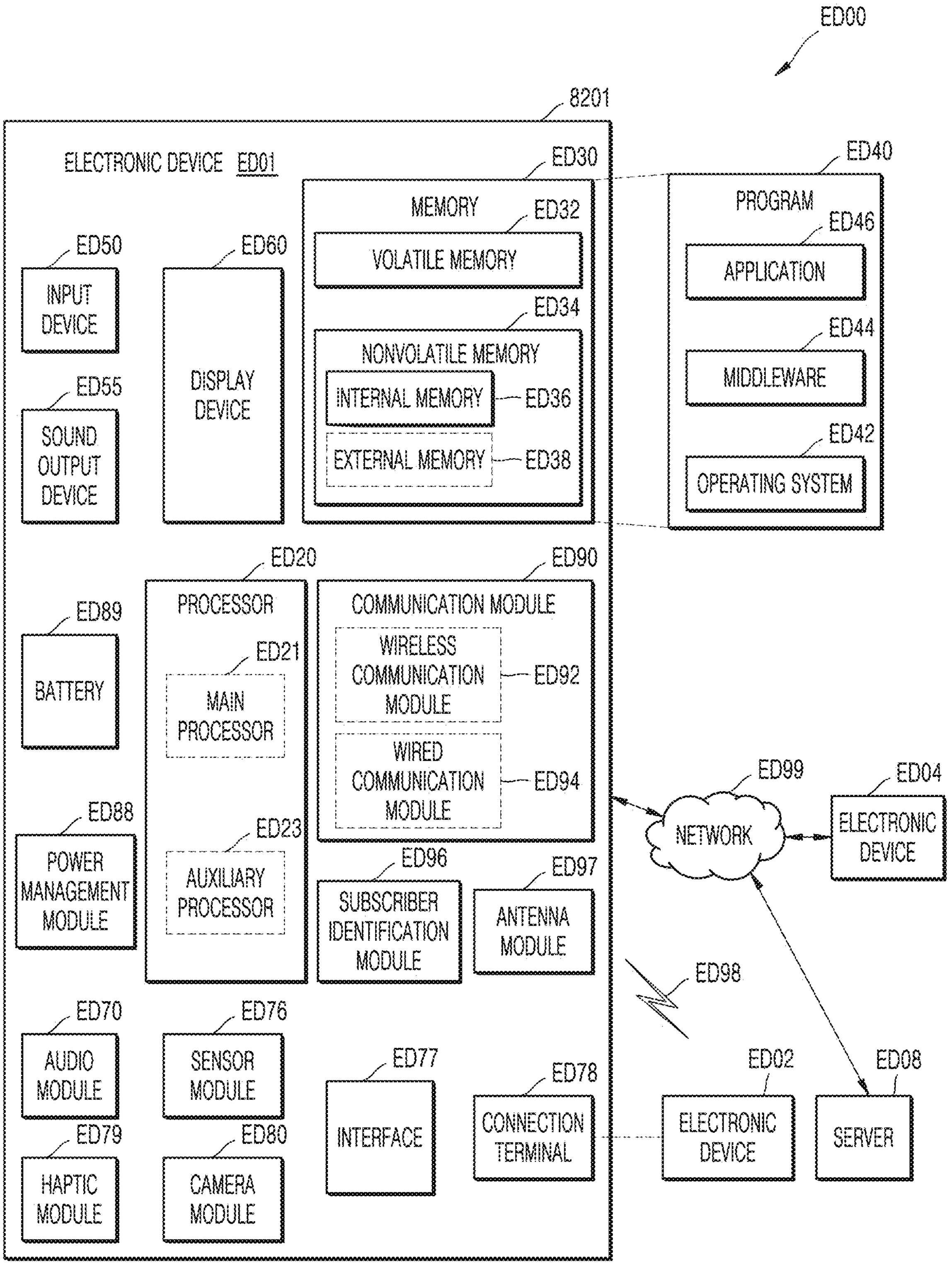
FIG. 11 is a block diagram schematically illustrating an electronic apparatus including an image sensor according to embodiments.

FIG. 11 is a block diagram schematically illustrating an electronic apparatus including an image sensor according to embodiments. Referring to FIG. 11, in a network environment ED00, an electronic device ED01 may communicate with another electronic device ED02 through a first network ED98 (a short-range wireless communication network or the like), or with another electronic device 2204 and/or a server ED08 through a second network ED99 (a long-range wireless communication network or the like). The electronic apparatus ED01 may communicate with the electronic apparatus 8204 through the server ED08. The electronic apparatus ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (such as the display device ED60) of these components may be omitted from or other components may be added to the electronic device ED01. Some of these components may be implemented as one integrated circuit. For example, the sensor module ED76 (fingerprint sensor, iris sensor, illumination sensor, etc.) may be implemented by being embedded in the display device ED60 (display, etc.).

The processor ED20 may execute software (program ED40 or the like) to control one or a plurality of other components (hardware and software components, or the like) of the electronic device ED01 connected to the processor ED20, and may perform processing or operations of various data. As part of data processing or operation, the processor ED20 may load commands and/or data received from other components (sensor modules ED76, communication modules (ED90, etc.), process commands and/or data stored in volatile memory ED32, and store the result data in nonvolatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may be operated independently of or together with the main processor ED21. The auxiliary processor ED23 may use less power than the main processor ED21 and perform a specialized function.

The auxiliary processor ED23 may control functions and/or states related to some (the display device ED60, sensor module ED10, communication module ED90, etc.) of the components of the electronic apparatus ED01, in place of the main processor ED21 while the main processor ED21 is in an inactive state (slip state), or together with the main processor ED21 while the main processor ED21 is in an active state (application execution state). The auxiliary processor ED23 (image signal processor, communication processor, etc.) may be implemented as part of other functionally related components (camera module 8280, communication module 8290, etc.).

The memory ED30 may store various data required by components (processor ED20 and sensor module ED76) of the electronic apparatus ED01. The data may include, for example, input data and/or output data for software (program ED40 or the like) and related commands. The memory ED30 may include a volatile memory ED32 and/or a nonvolatile memory ED34.

The program ED40 may be stored in the memory ED30 as software, and may include an operating system ED42, middleware ED44, and/or an application ED46.

The input device ED50 may receive commands and/or data to be used in components (processor ED20, etc.) of the electronic apparatus ED01 from the outside (user, etc.) of the electronic apparatus ED01. The input device ED50 may include a microphone, a mouse, a keyboard, and/or a digital pen (such as a stylus pen, etc.).

The sound output device ED55 may output the sound signal to the outside of the electronic apparatus ED01. The sound output device ED55 may include a speaker and/or a receiver. Speakers may be used for general purposes such as multimedia playback or recording playback, and receivers may be used to receive incoming calls. The receiver may be coupled as part of a speaker or may be implemented as an independent separate device.

The display device ED60 may visually provide information to the outside of the electronic device ED01. The display device ED60 may include a display, a hologram device, or a projector and a control circuit for controlling the corresponding devices. The display device ED60 may include a touch circuitry configured to sense a touch, and/or a sensor circuit (a pressure sensor, etc.) configured to measure an intensity of a force generated by the touch.

The audio module ED70 may convert sound into an electrical signal or conversely convert the electrical signal into sound. The audio module ED70 may acquire sound through the input device ED50 or output sound through the sound output device ED55 and/or a speaker and/or a headphone of another electronic apparatus (e.g., electronic apparatus ED02, etc.) directly or wirelessly connected to the electronic apparatus ED01.

The sensor module ED76 may detect an operating state (power, temperature, etc.) or an external environmental state (user state, etc.) of the electronic apparatus ED01 and generate an electrical signal and/or a data value corresponding to the sensed state. The sensor module ED76 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

The interface ED77 may support one or more designated protocols that may be used for electronic apparatus ED01 to be directly or wirelessly connected to another electronic apparatus (e.g., electronic apparatus ED02, etc.). The interface ED77 may include a high definition multimedia interface (HDMI), a universal serial bus (USB) interface, an SD card interface, and/or an audio interface.

The connection terminal ED78 may include a connector through which the electronic apparatus ED01 may be physically connected to another electronic apparatus (e.g., electronic apparatus ED02, etc.). The connection terminal ED78 may include an HDMI connector, a USB connector, an SD card connector, and/or an audio connector (such as a headphone connector, etc.).

The haptic module ED79 may convert an electrical signal to a mechanical stimulus (vibration, motion, etc.) or an electrical stimulus that a user can recognize through a tactile or motion sensation. The haptic module ED79 may include a motor, a piezoelectric element, and/or an electrical stimulus.

The camera module ED80 may capture a still image and a moving image. The camera module ED80 may include a lens assembly including one or more lenses, image sensors, image signal processors, and/or flashes. The lens assembly included in the camera module ED80 may concentrate light emitted from an object to be photographed.

The power management module ED88 may manage power supplied to the electronic apparatus ED01. The power management module ED88 may be implemented as part of a power management integrated circuit (PMIC).

The battery ED89 may supply power to components of the electronic apparatus ED01. The battery ED89 may include a non-rechargeable primary battery, a rechargeable secondary battery, and/or a fuel cell.

The communication module ED90 may establish a direct (wired) communication channel and/or wireless communication channel between the electronic apparatus ED01 and another electronic apparatus (the electronic apparatus ED02, the electronic apparatus ED04, the server ED08, etc.), and support communication execution through the established communication channel. The communication module ED90 may include one or more communication processors that operate independently of the processor ED20 (application processor, etc.) and support direct communication and/or wireless communication. The communication module ED90 may include a wireless communication module ED92 (a cellular communication module, a short-range wireless communication module, a GNSS (Global Navigation Satellite System, etc.) communication module, and/or a wired communication module ED94 (a local area network (LAN) communication module, a power line communication module, etc.). A corresponding communication module of these communication modules may communicate with other electronic apparatuses through a first network ED98 (a short-range communication network such as Bluetooth, WiFi Direct, or infrared data association (IrDA)), or a second network ED99 (a long-range communication network such as a cellular network, Internet, or computer network (LAN, WAN, etc.)). These various types of communication modules may be integrated into a single component (such as a single chip, etc.), or may be implemented as a plurality of separate components (multiple chips). The wireless communication module ED92 may identify and authenticate the electronic apparatus ED01 in a communication network such as a first network ED98 and/or a second network ED99 using subscriber information (such as an international mobile subscriber identifier (IMSI) stored in the subscriber identification module ED96.

The antenna module ED97 may transmit a signal and/or power to the outside (such as another electronic apparatus, etc.) or receive the signal and/or power from the outside. The antenna may include a radiator formed of a conductive pattern formed on the substrate (PCB, etc.). The antenna module ED97 may include one or a plurality of antennas. When a plurality of antennas are included, an antenna suitable for a communication scheme used in a communication network such as a first network ED98 and/or a second network ED99 may be selected from among the plurality of antennas by the communication module ED90. A signal and/or power may be transmitted or received between the communication module ED90 and another electronic apparatus through the selected antenna. Other components (RFIC, etc.) in addition to the antenna may be included as a part of the antenna module ED97.

Some of the components are connected to each other and may exchange signals (commands, data, etc.) via a communication scheme (bus, General Purpose Input and Output (GPIO), Serial Peripheral Interface (SPI), Mobile Industry Processor Interface (MIPI), etc.) and can interchange signals (commands, data, etc.) between peripherals.

The command or data may be transmitted or received between the electronic apparatus ED01 and the external electronic apparatus ED04 through the server ED08 connected to the second network ED99. Other electronic apparatuses ED02 and ED04 may be the same or different types of apparatuses as the electronic apparatus ED01. All or some of the operations executed in the electronic apparatus ED01 may be executed in one or more of the other electronic apparatuses ED02, ED04, and ED08. For example, when the electronic apparatus ED01 needs to perform a function or service, it may request one or more other electronic apparatuses to perform part or all of the function or service instead of executing the function or service on its own. One or more other electronic apparatuses receiving the request may execute an additional function or service related to the request and transmit a result of the execution to the electronic apparatus ED01. To this end, cloud computing, distributed computing, and/or client-server computing technology may be used.

Figure 12:
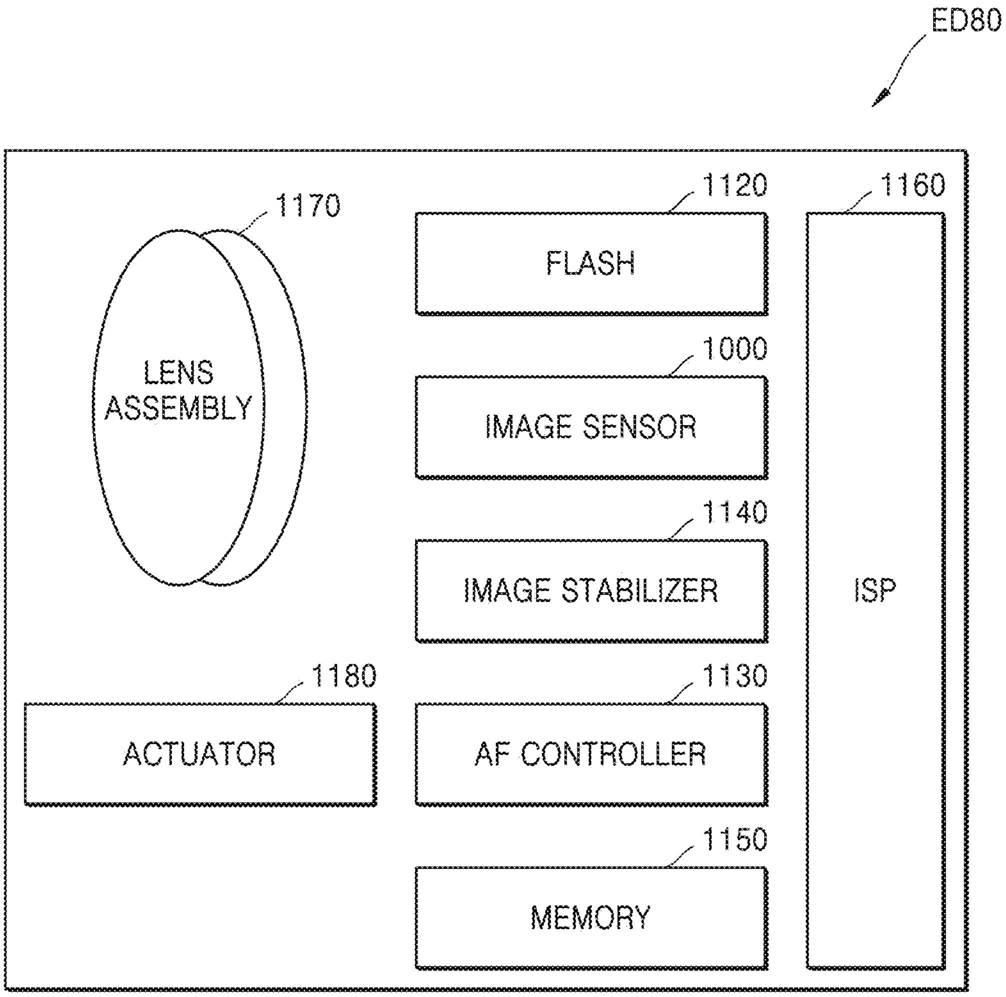
FIG. 12 is a block diagram illustrating a camera module provided in the electronic apparatus of FIG. 11.

FIG. 12 is a block diagram illustrating the camera module ED80 provided in the electronic apparatus of FIG. 11. Referring to FIG. 12, the camera module ED80 may include a lens assembly 1170, a flash 1120, an image sensor 200, an image stabilizer 1140, an auto-focus (AF) control unit 1130, a memory 1150 (buffer memory, etc.), an actuator 1180 and/or an image signal processor (ISP) 1160.

The lens assembly 1170 may concentrate light emitted from a subject that is an object of image photographing. The lens assembly 1170 may include one or more optical lenses. The lens assembly 1170 may include a path change member that changes the path of light to face the image sensor 1000. Depending on the arrangement of the path switching member and the arrangement form with the optical lens, the camera module ED80 may have a vertical form or a folded form. The camera module ED80 may include a plurality of lens assemblies 1170, and in this case, the camera module ED80 may be a dual camera, a 360° camera, or a spherical camera. Some of the plurality of lens assemblies 1170 may have the same lens attributes (view angle, focal distance, automatic focus, F Number, optical zoom, etc.) or other lens attributes. The lens assembly 1170 may include a wide-angle lens or a telephoto lens.

The actuator 1180 may drive the lens assembly 1170. For example, at least some of the optical lenses and the path switching members constituting the lens assembly 1170 may move by the actuator 1180. The optical lens may move along the optical axis and adjust the distance between adjacent lenses by moving at least part of the optical lenses included in the lens assembly 1170, thereby adjusting the optical zoom ratio.

The actuator 1180 may adjust the position of any one optical lens included in the lens assembly 1170 so that the image sensor 1000 is located at the focal length of the lens assembly 1170. The actuator 1180 may drive the lens assembly 1170 according to the AF driving signal transmitted from the AF controller 1130.

The flash 1120 may emit light used to enhance light emitted or reflected from the subject. The flash 1120 may emit visible light or infrared light. Flash (1120) may include one or more light-emitting diodes (RGB (Red-Green-Blue) LED, White LED, Infrared LED, Ultraviolet LED, etc.), and/or a Xenon Lamp. The image sensor 1000 may be the image sensor 200 described in FIG. 1, or any one of the image sensors 1001 and 1012 described above, or a combination or modified form thereof. The image sensor 1000 may convert light emitted or reflected from a subject and transmitted through the lens assembly 1170 into an electrical signal, and obtain an image corresponding to the subject.

The image sensor 1000 may be equipped with the meta-prism array MP described above, and each pixel may include a plurality of light sensing cells that form a plurality of channels, for example, a plurality of light sensing cells arranged in a 2×2 matrix. Some of these pixels may be used as AF pixels, and the image sensor 1000 may generate AF driving signals from signals from the plurality of channels in the AF pixels.

In response to the movement of the camera module ED80 or the electronic device ED01 including the same, the image stabilizer 1140 may move the one or more lenses or the image sensor 1000 included in the lens assembly 1170 in a specific direction or control an operation characteristic (adjustment of read-out timing and the like) of the image sensor 1000 to compensate for a negative impact caused by the movement. The image stabilizer 1140 may detect the movement of the camera module ED80 or the electronic device ED01 using a gyro sensor or an acceleration sensor placed inside or outside the camera module ED80. The image stabilizer 1140 may be implemented optically.

The AF controller 1130 may generate an AF driving signal from a signal value sensed from the AF pixel of the image sensor 1000. The AF controller 1130 may control the actuator 1180 according to the AF driving signal.

The memory 1150 may store some or all data of an image acquired through the image sensor 1000 for a next image processing operation. For example, if a plurality of images are acquired at high speed, the acquired original data (Bayer-Patterned data, high-resolution data, etc.) may be stored in memory 1150, only low-resolution images may be displayed, and the original data of the selected image may then be transmitted to the image signal processor 1160. The memory 1150 may be integrated into the memory ED30 of the electronic device ED01 or may be configured as a separate memory that is operated independently.

The ISP 1160 may perform image processes on image obtained through the image sensor 1000 or image data stored in the memory 1150. The image processing may include depth map generation, three-dimensional modeling, panoramic generation, feature point extraction, image synthesis, and/or image compensation (noise reduction, resolution adjustment, brightness adjustment, blurring, sharpening, softening, etc.). The image signal processor 1160 may perform control (exposure time control, read-out timing control, etc.) on components (image sensor 1000, etc.) included in the camera module ED80. The image processed by the image signal processor 1160 may be stored again in the memory 1150 for further processing or may be provided to external components (memory ED30, display device ED60, electronic device ED02, electronic device ED04, server ED08, etc.) of the camera module ED80. The image signal processor 1160 may be integrated into the processor ED20 or may be configured as a separate processor operated independently of the processor ED20. In the case that the image signal processor 1160 is composed of a separate processor from the processor ED20, the image processed by the image signal processor 1160 may be displayed through the display device ED60 after additional image processing by the processor ED20.

The AF controller 1130 may be integrated into the image signal processor 1160. The ISP 1160 processes signals from the auto-focusing pixels of the image sensor 1000 to generate AF signals, and the AF controller 1130 may convert the AF signals into drive signals for driving the actuator 1180 and transmit the same to the actuator 1180.

The image sensor 1000 according to embodiments may be applied to various electronic devices.

The image sensor 1000 according to embodiments may be applied to a mobile phone or a smartphone, a tablet or a smart tablet, a digital camera or camera recorder (called a camcorder), a laptop computer, a television, a smart television, or the like. For example, the smartphone or smart tablet may include a plurality of high-resolution cameras each equipped with a high-resolution image sensor. High-resolution cameras may be used to extract depth information from subjects in the image, adjust the out-focusing of the image, or automatically identify subjects in the image.

In addition, the image sensor 1000 may be applied to a smart refrigerator, a security camera, a robot, a medical camera, and the like. For example, the smart refrigerator may automatically recognize food in the refrigerator using an image sensor and inform the user of the presence of a specific food, the type of food received or taken out, etc. through a smartphone. Security cameras may provide ultra-high-resolution images and may use high sensitivity to recognize objects or people in the images even in dark environments. Robots may be deployed at a disaster or industrial site to which people do not directly access to provide high-resolution images. Medical cameras may provide high-resolution images for diagnosis or surgery and may dynamically adjust the field of view.

In addition, the image sensor 1000 may be applied to a vehicle. The vehicle may include a plurality of vehicle cameras arranged at various positions. Each vehicle camera may include an image sensor according to an embodiment. The vehicle may provide the driver with various information about the inside or surroundings of the vehicle using the plurality of vehicle cameras, and may automatically recognize objects or people in the image to provide information necessary for autonomous driving.

The image sensor including the lens array and the image acquisition apparatus including the same have been described with reference to the embodiments illustrated in the drawings.

While example embodiments have been particularly shown and described, it will be understood that various changes in form and details may be made therein without departing from the spirit and scope of the following claims.

What is claimed is:

1. An image acquisition apparatus comprising:
- an image sensor comprising a microlens and a plurality of pixels arranged adjacent to each other and sharing the microlens; and
- a processor configured to process an input image acquired by the image sensor, wherein the processor is further configured to:
  - perform a white balance processing on the input image;
  - after performing the white balance processing, generate a plurality of parallax images by extracting and combining sub-images having a same parallax from the input image;
  - generate RGB demosaic images by interpolating a color value of an empty pixel for each of the plurality of parallax images by using color values of surrounding pixels;
  - generate a plurality of upsampled images by upsampling each of the RGB demosaic images to an input image size; and
  - generate an output image by weighted-summing one reference upsampled image selected from the upsampled images and the other upsampled images based on a similarity therebetween.

2. The image acquisition apparatus of claim 1, wherein the processor is further configured to generate the RGB demosaic images by using one of average value interpolation, linear interpolation, cubic interpolation, and directional by linear interpolation.

3. The image acquisition apparatus of claim 1, wherein the image sensor comprises:
- a quad Bayer pattern array in which pixels arranged in a 2×2 matrix comprise respective color filters having a same color; or
- a quad square Bayer pattern array in which pixels arranged in a 4×4 matrix comprise respective color filters having a same color.

4. The image acquisition apparatus of claim 3, wherein the processor is further configured to generate, as the plurality of parallax images, a parallax A image, a parallax B image, a parallax C image, and a parallax D image from the input image.

5. The image acquisition apparatus of claim 4, wherein the processor comprises:

a plurality of logics configured to simultaneously interpolate each of the parallax A image, the parallax B image, the parallax C image, and the parallax D image; or a single logic configured to sequentially interpolate the parallax A image, the parallax B image, the parallax C image, and the parallax D image.

6. The image acquisition apparatus of claim 1, wherein the processor is further configured to generate the upsampled images by using one of a bi-linear interpolation, a bi-cubic interpolation, and a deep learning network.

7. The image acquisition apparatus of claim 1, wherein the processor is further configured to determine the similarity between the reference upsampled image and the other upsampled images by using one of a sum of absolute differences (SAD), a sum of squared differences (SSD), a normalized cross correlation (NCC), and a zero-mean normalized cross correlation (ZNCC).

8. The image acquisition apparatus of claim 1, wherein the processor is further configured to detect an aliasing region of the upsampled images.

9. The image acquisition apparatus of claim 8, wherein the processor is further configured to increase a weight of the similarity in a case that the similarity between the reference upsampled image and the other upsampled images is lower than a preset value in the aliasing region.

10. The image acquisition apparatus of claim 8, wherein the processor is further configured to:

output edge result values by using directional filters;

output an edge absolute value by performing absolute value processing of the edge result values; and generate an edge map by using an input value determined based on the edge absolute value and a control signal.

11. The image acquisition apparatus of claim 10, wherein the directional filters comprise a horizontal directional filter, a vertical directional filter, a 45-degree directional filter, and a 135-degree directional filter.

12. The image acquisition apparatus of claim 11, wherein the control signal comprises one of:

a first control signal to generate the edge map by using, as the input value, a maximum value among an edge absolute value of the horizontal directional filter, an edge absolute value of the vertical directional filter, an edge absolute value of the 45-degree directional filter, and an edge absolute value of the 135-degree directional filter;

a second control signal to generate the edge map by using, as the input value, an average value of the edge absolute value of the horizontal directional filter, the edge absolute value of the vertical directional filter, the edge absolute value of the 45-degree directional filter, and the edge absolute value of the 135-degree directional filter; and a third control signal to generate the edge map by using, as the input value, a maximum value of a weighted average value of the edge absolute value of the horizontal directional filter and the edge absolute value of the vertical directional filter and a weighted average value of the edge absolute value of the 45-degree directional filter, and the edge absolute value of the 135-degree directional filter.

13. The image acquisition apparatus of claim 10, wherein the processor is further configured to:

determine that the input value is not an edge based on the input value being less than a first threshold value;

determine that the input value is an edge based on the input value being greater than a second threshold value; and perform linear interpolation based on determining that the input value is between the first threshold value and the second threshold value.

14. The image acquisition apparatus of claim 1, wherein the processor is further configured to perform a color shading compensation on the input image before the white balance processing.

15. The image acquisition apparatus of claim 14, wherein the processor is further configured to crop only a target region from the input image between the color shading compensation and the white balance processing.

16. An image acquisition method used by an image acquisition apparatus comprising an image sensor, comprising a microlens and a plurality of pixels arranged adjacent to each other and sharing the microlens, the image acquisition method comprising:

performing a white balance processing on an input image acquired by the image sensor;

after the performing the white balance processing, generating a plurality of parallax images by extracting and combining sub-images having a same parallax from the input image;

demosaicing images by interpolating a color value of an empty pixel for each of the plurality of parallax images by using color values of surrounding pixels;

generating, by an upsampling unit, a plurality of upsampled images by upsampling each of the interpolated parallax images to an input image size; and image-synthesizing comprising generating an output image by weighted-summing one upsampled image selected from the upsampled images and the other upsampled images based on a similarity therebetween.

17. The image acquisition method of claim 16, wherein the image sensor comprises:

a quad Bayer pattern array in which pixels arranged in a 2×2 matrix comprise respective color filters having same color; or a quad square Bayer pattern array in which pixels arranged in a 4×4 matrix comprise respective color filters having same color.

18. The image acquisition method of claim 16, wherein the image-synthesizing further comprises detecting an aliasing region of the upsampled images.

19. The image acquisition method of claim 18, wherein, in the image-synthesizing, a weight of the similarity is increased in a case that the similarity is lower than a preset value in the aliasing region.

* * * * *